United States Patent [19]
Cheng

[11] Patent Number: 6,151,032
[45] Date of Patent: Nov. 21, 2000

[54] STROKE-BASED GLYPH-OUTLINE FONT GENERATION IN LOW/HIGH RESOLUTION SPACE

[75] Inventor: Kuo-Young Cheng, Taichung Hsien, Taiwan

[73] Assignee: DynaLab, Inc., Taipei, Taiwan

[21] Appl. No.: 09/028,164

[22] Filed: Feb. 23, 1998

Related U.S. Application Data

[63] Continuation-in-part of application No. 08/787,083, Jan. 22, 1997, Pat. No. 5,852,448, which is a continuation-in-part of application No. 08/717,172, Sep. 20, 1996.

[51] Int. Cl.[7] .................................................. G06F 15/00
[52] U.S. Cl. ......................................................... 345/469
[58] Field of Search .................................... 345/467, 470, 345/472, 471, 144, 468, 469, 141, 142

[56] References Cited

U.S. PATENT DOCUMENTS

| | | | |
|---|---|---|---|
| 4,897,638 | 1/1990 | Kokunishi et al. | 340/751 |
| 4,907,282 | 3/1990 | Daly et al. | 345/471 |
| 4,990,903 | 2/1991 | Cheng et al. | 340/731 |
| 5,119,296 | 6/1992 | Zheng et al. | 364/419 |
| 5,212,769 | 5/1993 | Pong | 395/150 |
| 5,450,096 | 9/1995 | Yoshida et al. | 345/141 |
| 5,579,416 | 11/1996 | Shibuya et al. | 382/293 |
| 5,594,855 | 1/1997 | Von Ehr, II et al. | 395/142 |
| 5,727,140 | 3/1998 | Ohtomo et al. | 395/167 |
| 5,734,748 | 3/1998 | Amano | 382/181 |
| 5,936,637 | 8/1999 | Seto | 345/470 |

*Primary Examiner*—Phu K. Nguyen
*Attorney, Agent, or Firm*—Christensen O'Connor Johnson & Kindness PLLC

[57] ABSTRACT

A method, computer system and computer-readable medium for generating an outline font of Asian language characters. The Asian language characters are defined by basic strokes. The basic strokes are identified by a plurality of key points and at least one width value. The computer system includes memory and a processor coupled to at least one output device. The processor retrieves a set of basic stroke defined characters and identifies a set of similar glyphs in the retrieved set of characters. Each glyph includes a set of basic strokes. The processor selects topographically representative glyphs from each identified set of similar glyphs, determines the intersecting points of the plurality of overlapping basic strokes for each selected glyph, generates outline data for each selected glyph according to the determined intersecting points and stores the generated outline data in memory. The processor also renders a character selected for display on an output device according to the stored generated outline data.

13 Claims, 34 Drawing Sheets

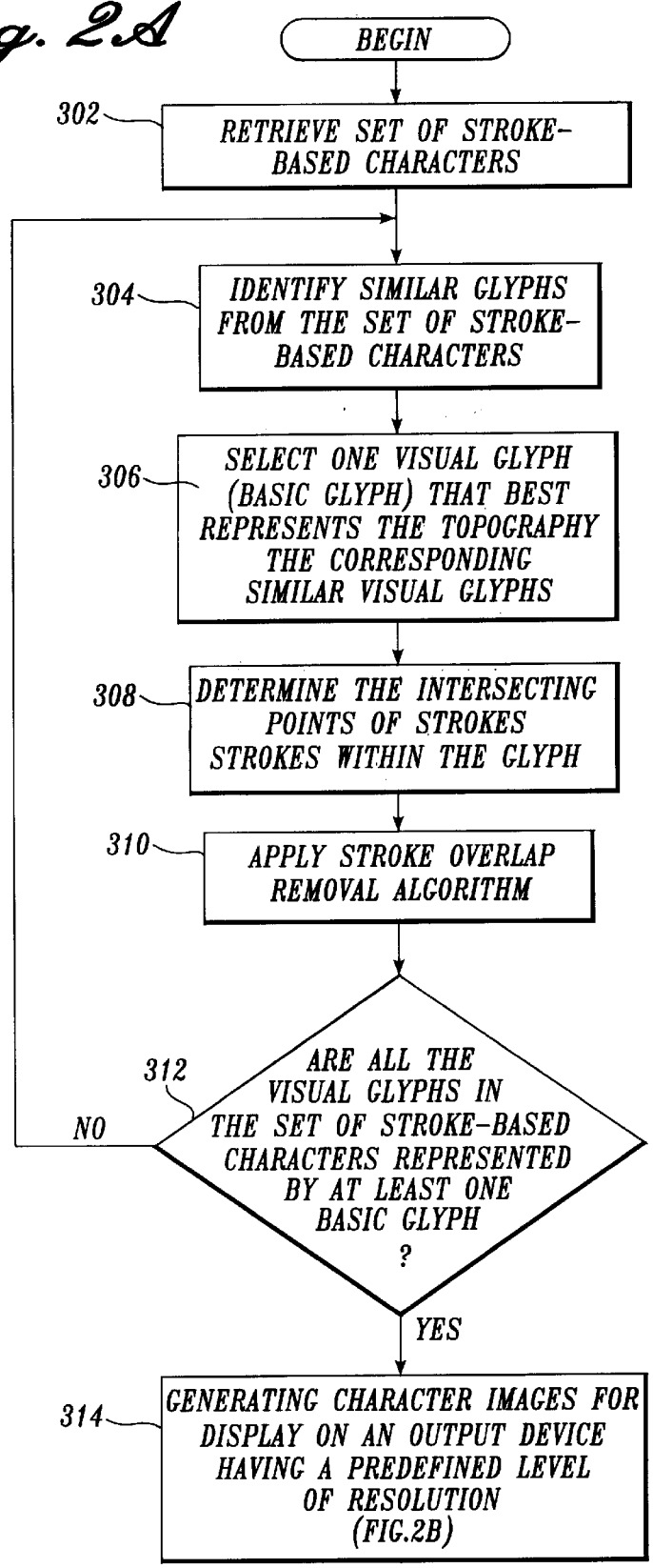

| STROKE CODES | WIDTH CODES | KEY-POINT LOCATIONS |
|---|---|---|
| 0 | 10, 20 | (341, 31), (38, 344) |

| FEATURE POINTS CODES | REFERENCED KEY POINTS | REFERENCED RELATIVE POSITIONS | REFERENCED WIDTHS CODES |
|---|---|---|---|
| 0 | (0, 0) | (0.8, −1.0) | (0, 0) |
| 1 | (1, 1) | (−0.3, 0.5) | (1, 1) |

| CURVE SEGMENT CODES | END POINTS (FEATURE POINTS CODES) | MID-CONTROL POINT RATIOS |
|---|---|---|
| 0 | (0, 1) | (0.309, 0.009), (0.252, 0.24), (0.075, 0.522), (0.384, 0.705), (0.611, 0.591) |

AREAS    VERTICES

TREE STRUCTURES VS. INFIX NOTATIONS

| CURVE SEGMENT CODES | CURVE SEGMENT | TREE STRUCTURES | IN-FIX NOTATIONS |
|---|---|---|---|
| 0 | $Pa = 0$ (FEATURE POINTS CODES)<br>$P0 = (0.309, 0.009)$<br>$P1 = (0.252, 0.24)$<br>$P2 = (0.075, 0.522)$<br>$P3 = (0.354, 0.705)$<br>$P4 = (0.611, 0.591)$<br>$Pb = 1$ (FEATURE POINTS CODES) | ─143 | [Pa[P0 P1 [P2 P3 P4]] Pb] ─144 |

*Fig. 3H*

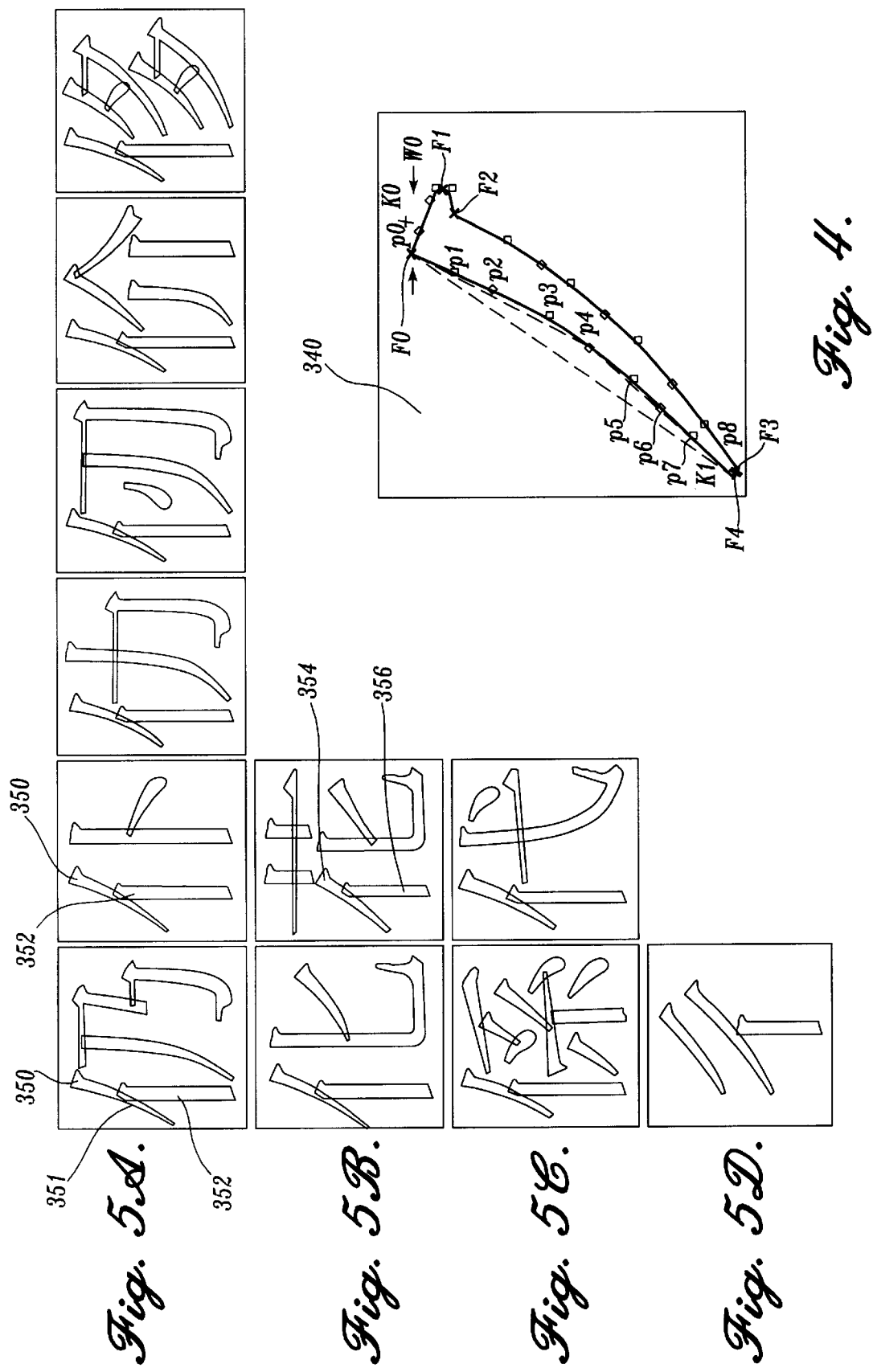

|  | WIDTH | * | HEIGHT | | LEVEL |
|---|---|---|---|---|---|
| <= | 24 | | 24 | | 0 |
| <= | 48 | | 48 | | 1 |
| <= | 127 | | 127 | | 2 |
| >= | 128 | | 128 | | -1 |

NOTE: LEVEL=-1 MEANS FULL LEVEL

OK    CANCEL

*Fig. 15.*

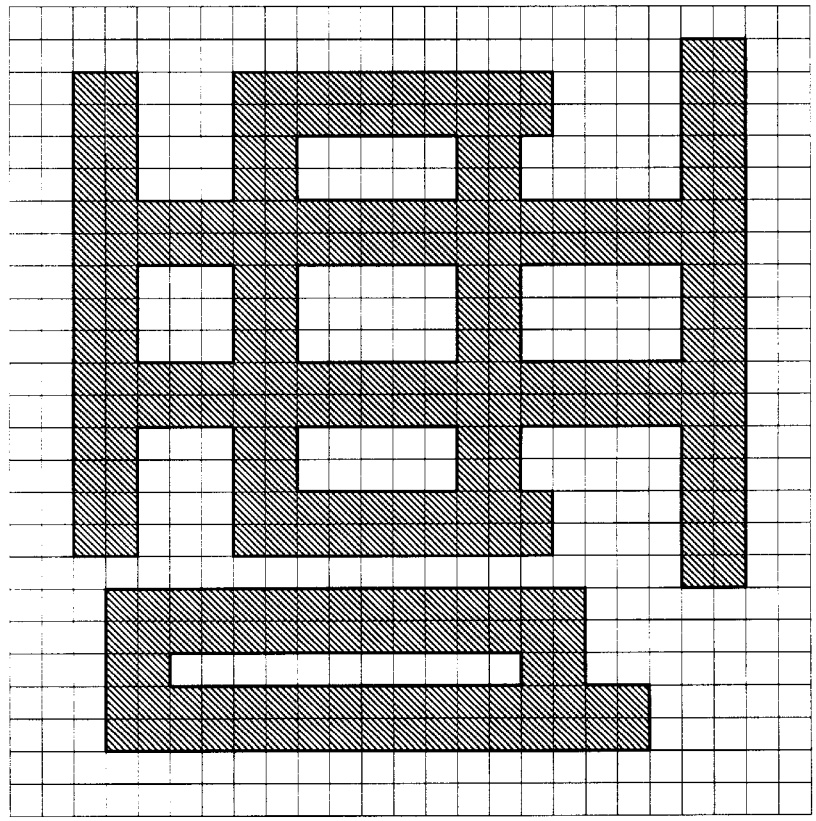
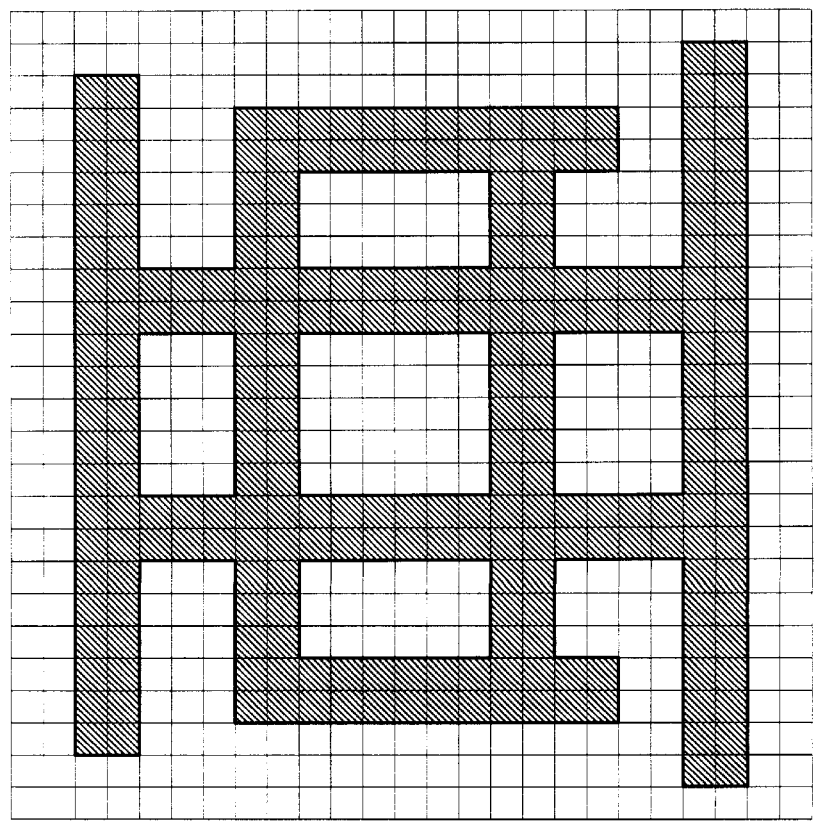
Fig. 18.

STROKE-BASED GLYPH-OUTLINE FONT GENERATION IN LOW/HIGH RESOLUTION SPACE

RELATIONSHIP TO OTHER APPLICATIONS

This is a continuation-in-part of U.S. patent application Ser. No. 08/787,083, filed Jan. 22, 1997 now U.S. Pat. No. 5,852,448 which is a continuation-in-part of U.S. patent application Ser. No. 08/717,172, filed Sep. 20, 1996.

FIELD OF THE INVENTION

The invention relates to the art of generating digital representations of typographic bitmap characters or other symbols and, more particularly, methods and computer-readable medium for generating outline fonts of characters or symbols for low and high-resolution space.

BACKGROUND OF THE INVENTION

Many font generating systems exist for generating a family of Asian font characters or an Asian font. An Asian font is composed of a large number of characters or character patterns. The following are various character pattern generating techniques.

One method of generating character patterns is a stroke-based technique that uses character pattern data. This character pattern data includes skeleton pattern data, stroke thickness data and shape parameter data, see U.S. Pat. No. 4,897,638. Another stroke-based technique defines characters with strokes defined by height, width and curvature points, see U.S. Pat. No. 4,990,903. These stroke-based techniques are good for generating high-level descriptions of characters but are incompatible with numerous types of low-level resolution devices and printing devices and are generally slow.

Another technique uses font outlines. This type of system is described in "PostScript Language Tutorial and Cookbook" by Adobe Systems, Inc. (Addison-Wesley Publishing, 1985). According to this technique, the outline of a character pattern is stored in the form of straight lines and curves, and a conversion such as enlargement, reduction, rotation or the like is carried out at the time of outputting of a character pattern. The outline of a character pattern is defined by pre-stored, fabricated outline data (Bézier curves). In addition, it is possible to store an original character pattern in the form of an outline with high quality. However, this method is ineffective for generating a database of character data displayable on high and low resolution devices. Also, Asian characters described in outline form occupy large amounts of memory space because of the tens of thousands of different types of characters. The processing of Asian characters described by this technique becomes extensive because overlap removal must be performed for all overlapping strokes within a character.

The present invention is directed to overcoming the foregoing and other disadvantages, such as Chinese character recognition. More specifically, the present invention is directed to providing a method, apparatus and computer-readable medium for generating stroke-based glyph outline fonts regardless of display resolution level.

SUMMARY OF THE INVENTION

In accordance with this invention, a method and computer-readable medium for generating resolution independent character images for display on a output device having a predefined level of resolution is disclosed. Each generated character is defined by a set of basic stroke-based glyphs. The method selects a character for display on the output device, and retrieves prestored basic stroke-based glyphs that are associated with the selected character. The prestored basic stroke-based glyphs include explicit and implicit data, wherein the explicit data includes key points and width values of the one or more strokes that define a glyph. The implicit data includes feature points and curve values of the strokes of a glyph, wherein the feature points, curve values and level of resolution of the output device define curve segment intersection information for each intersecting stroke of a glyph. Next, the method generates the selected character by rendering the retrieved stroke-based glyphs of the selected character according to predefined explicit and implicit data of the retrieved stroke-based glyphs and the level of resolution of the output device.

In accordance with other aspects of this invention, the generating of the selected character by rendering the retrieved stroke-based glyphs further includes rendering each glyph by filling the generated outline.

In accordance with still other aspects of this invention, the feature points, curve values and curve segment intersection information are associated with a range of levels of resolution.

In accordance with yet other aspects of this invention, the method further renders a glyph at a display space location different from the glyph's prestored display space location according to the level of resolution of the output device, wherein the glyph's prestored display space location is defined by the key points of the glyph's strokes.

In accordance with still yet other aspects of this invention, a graphical interface tool allows a user to define a set of characters as a set of basic stroke-based glyphs, wherein each character is defined by at least one stroke identified by one or more key points and one or more width values, and feature points and curve segments associated with a range of levels of resolution. With the graphical interface tool the user can retrieve characters with a similar glyph from the set of characters, wherein a glyph includes at least one stroke. If the similar glyphs include intersecting strokes, the tool determines the intersecting curve segments at the locations on the outlines of the intersecting strokes where the intersection between strokes occurs at various levels of resolution, and the characters from the retrieved set of characters that include similar glyphs with the same determined intersecting curve segments at the various levels of resolution. Then, the tool saves the stroke information that identifies the similar glyphs and the intersecting curve segments at various levels of resolution as a basic glyph for the determined characters.

The present invention is directed to overcoming the foregoing and other disadvantages. More specifically, the present invention is directed to providing a method, and computer-readable medium for efficiently storing outline related data, namely, stroke-based glyph data, and efficiently rendering characters according to the stored outline related data.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3H is an illustration showing the primary font data of the curves generated in FIGS. 3B–3G;

FIGS. 3I–3M are screen shots of a CAD tool used for resolution assignment to the generated curve levels;

FIGS. 4–8 are examples of the glyph generation in the process described in FIG. 2;

FIGS. 15–18 illustrates an example of a single character set that can be displayed at various levels of resolution.

DETAILED DESCRIPTION OF THE PREFERRED EMBODIMENT

Figure 1:
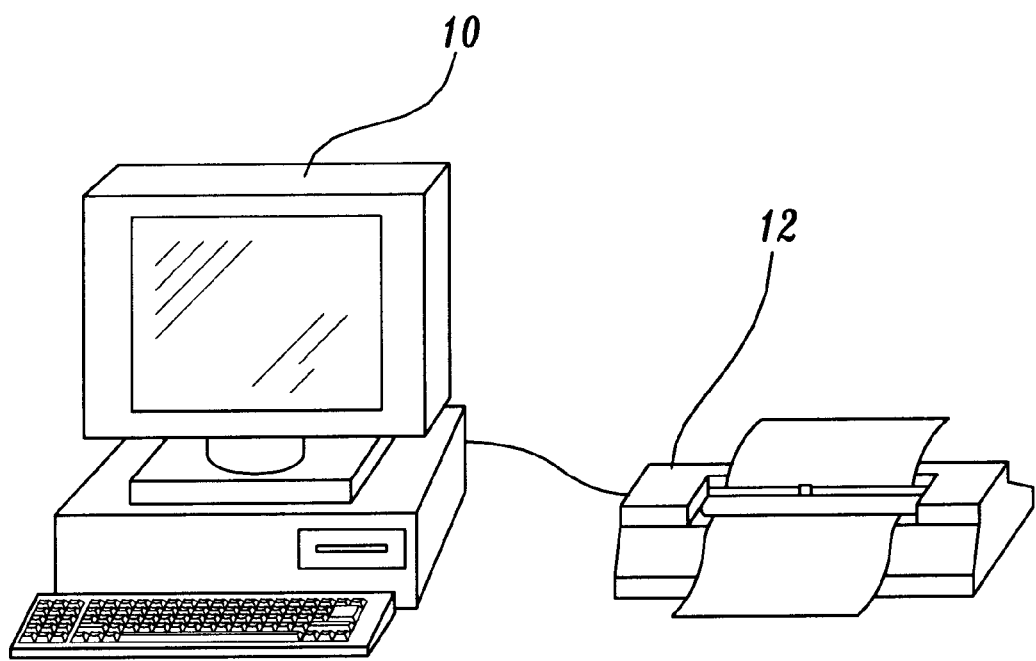
FIG. 1 is a drawing of a general purpose computer and printer for executing the methods of the present invention.

FIG. 1 is a display of a general purpose digital computer 10 with an attached printing device 12, which when loaded with a windowing type of software operating system, such as Windows 95™, is fully capable of performing the method of the present invention. The printing device 12 and the display of the digital computer 10 may print and display in either low (e.g. dot matrix) or high (e.g. laser) resolution quality. Other type of computing systems, such as networked or mainframe-based systems, are compatible with the present invention provided the system includes a compatible windows-based operating system.

The present invention generates outline character data that is compatible with the printer description file (.pdf) standard or other outline character formats. The outline character data that is operable with devices having various levels of detail is generated from a single set of data.

Figure 2B:
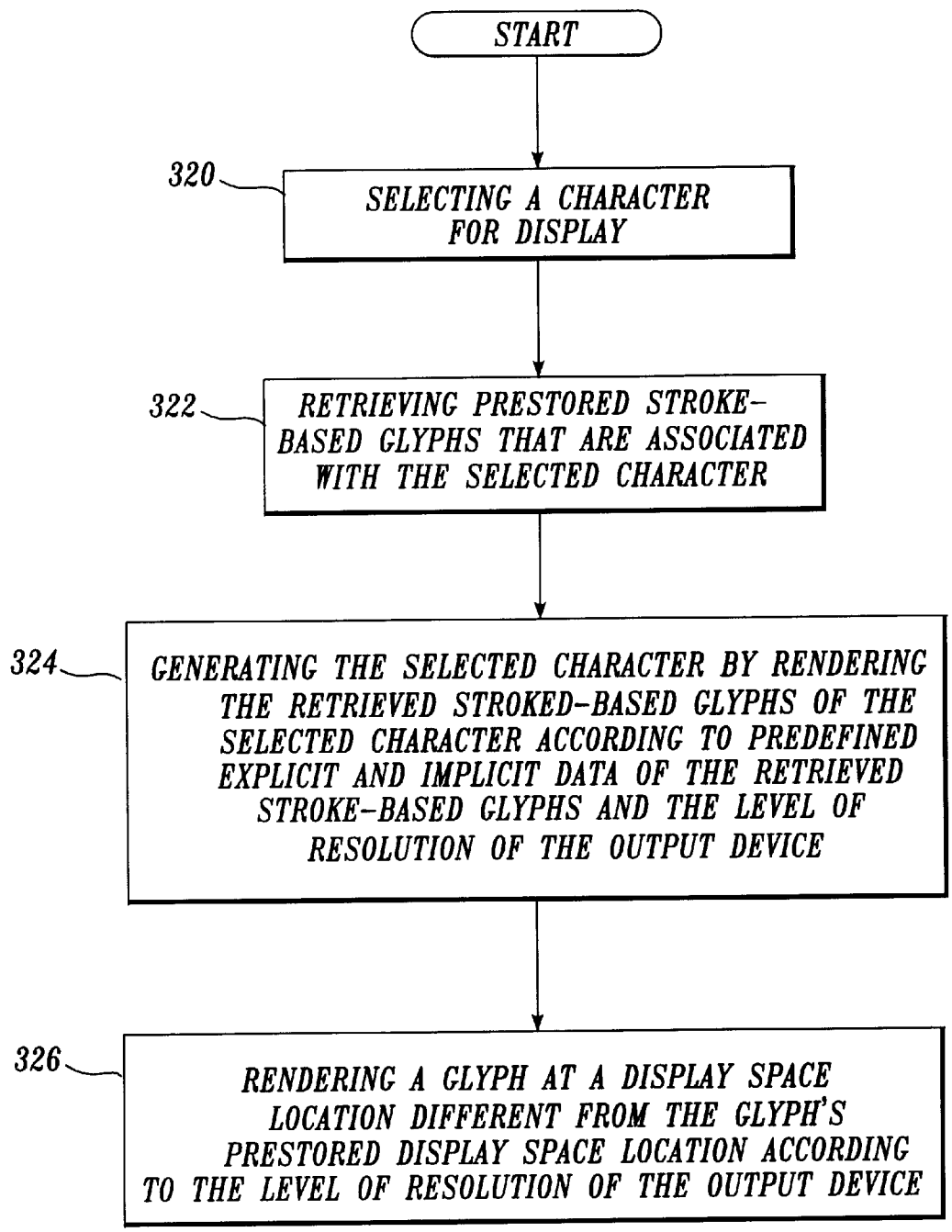
FIG. 2 is a flow diagram of the method for the construction of a stroke-based, glyph font in accordance with the claimed invention.

The present invention provides a system for generating the single set of data and for generating characters from the generated data. The single set of data for describing characters of multiple resolution is defined by a set of basic glyphs created from a predefined database of basic strokes. Each glyph comprises one or more intersecting predefined strokes. A set of basic glyphs is a reduced set of glyphs that represent, in a topographical matter, all the glyphs in a desired set of master characters. The steps for generating a set of characters defined by stroke-based glyphs are illustrated in FIG. 2A and described below. FIG. 2B illustrates the process of reconstructing characters defined by the process of FIG. 2A. FIGS. 3–8 illustrate examples of the present invention and are described below. The examples are for illustrative purposes only.

The steps shown in FIG. 2A illustrate the process for generating basic outline glyphs from predefined stroke-based characters. The predefined stroke-based characters are defined in character space by predefined key points and the key points width value at multiple levels of resolution. The following equation defines basic strokes of the stroke-based characters:

$$S_i = f_i(\{k_j\}, \{w_m\}, L) \ i=1, \ldots, n$$

S=stroke shape
i=stroke number
$f_i$=algorithm for producing $i^{th}$ stroke shape
k=input key point location
j=key point number in stroke i
w=input width value
m=width value number in stroke i
L=input level of resolution Each stroke is also defined by a set of Bézier triangles (curve segments) that vary in number depending upon the level of resolution required for printing or displaying the character described by a stroke(s).

CURVE LEVEL DEFINITION

FIGS. 3A–3G illustrate assigning curve values of a stroke to L-level of resolution. A font designer creates curve information sufficient for a low resolution display and more detailed curve information sufficient for a high resolution display, whereby the curve information is stored in a single tree-level table data structure.

Figure 3A:
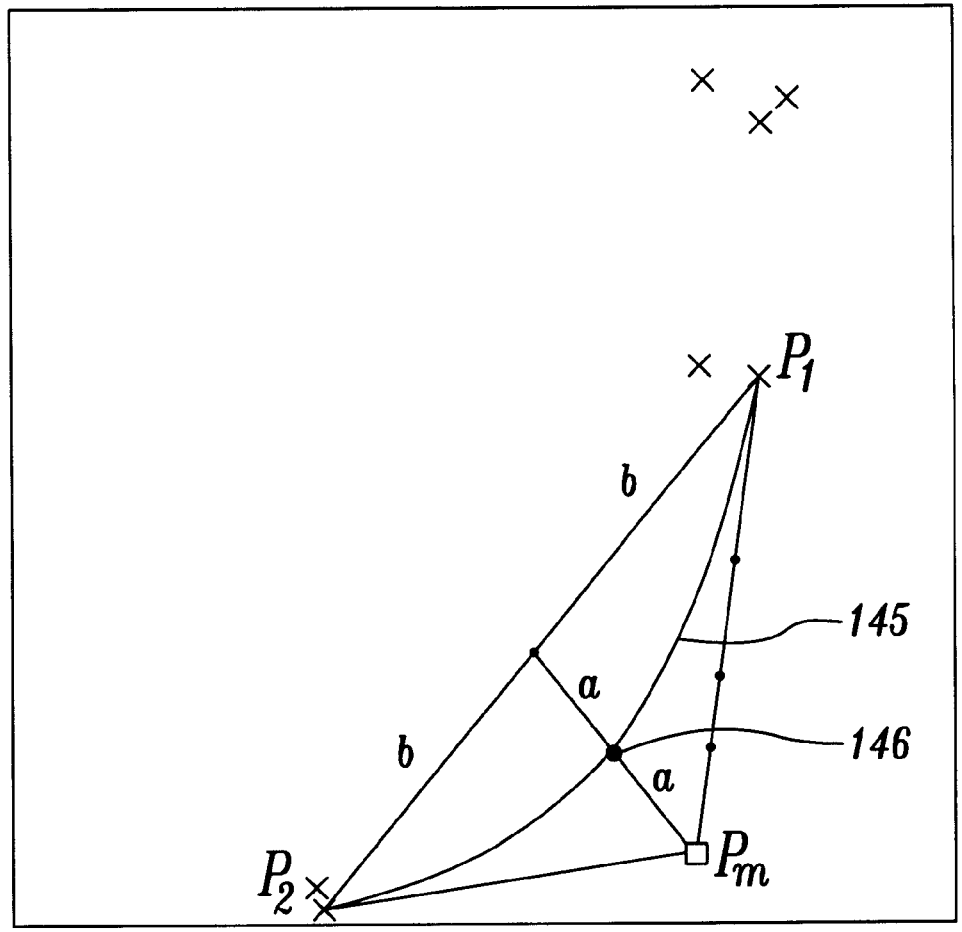
FIG. 3A is a screen shot illustrating curve generation geometry.

A line is initially generated between two feature points with a cursor controlled midcontrol point. A second order Bézier curve segment is generated to closely match the scanned outline image of the basic stroke between the two stationary points, such as two feature points. The second order Bézier curve geometry is illustrated in FIG. 3A. Second order Bézier curve generation creates a triangle between the two stationary points (feature points) $P_1$ and $P_2$ and the moveable midcontrol point $P_m$. Also, a line is connected between the midcontrol point $P_m$ and the midpoint of the line connecting stationary points $P_1$ and $P_2$. The generated curve segment 145 is tangent to both the line connecting $P_1$ to $P_m$ and $P_2$ to $P_m$ at point $P_1$ and $P_2$, respectively. Generated curve segment 145 also passes through the midpoint 146 of the line connecting $P_m$ to the midpoint of the line connecting $P_1$ and $P_2$.

Figure 3B:
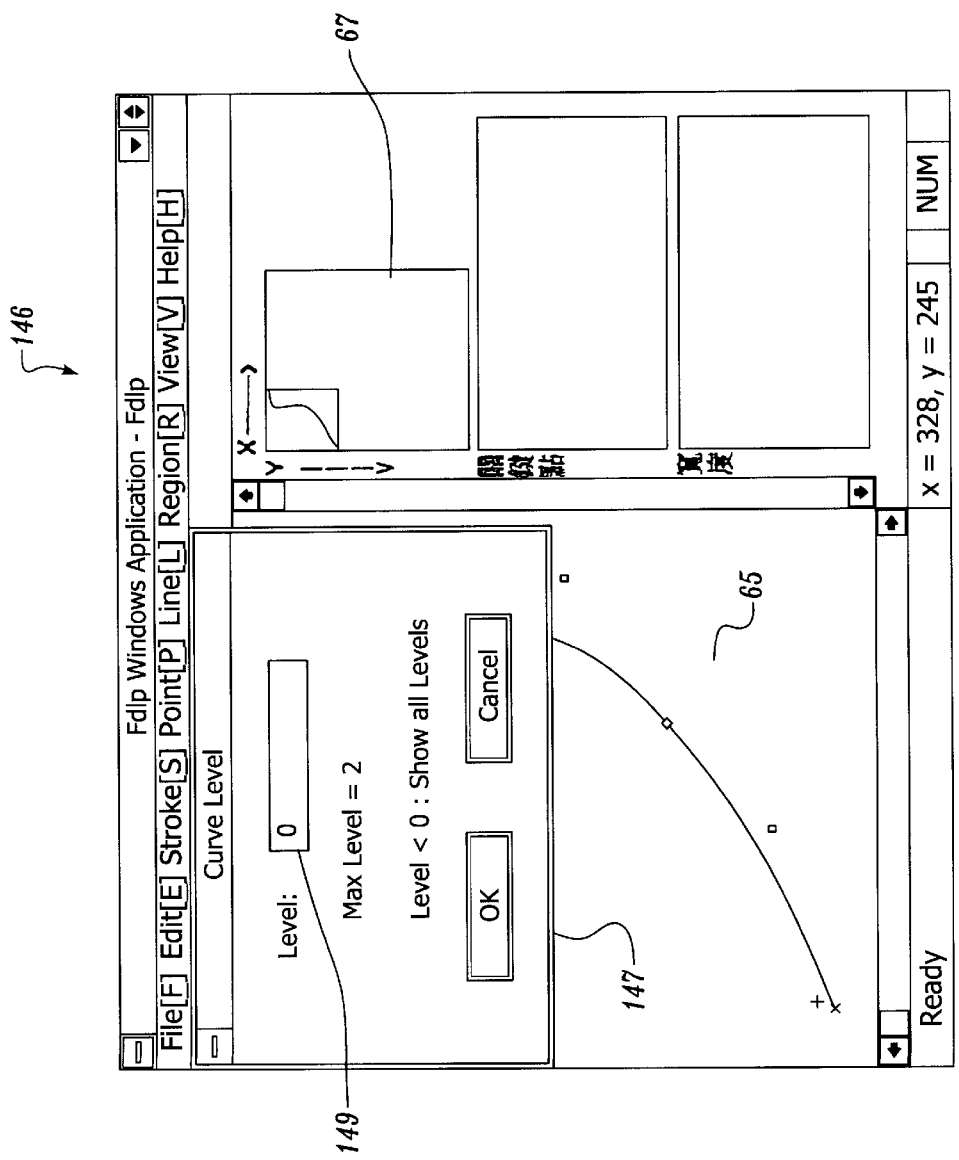
FIGS. 3B–3G are screen shots of a CAD tool used for curve level generation.
Figure 3C:
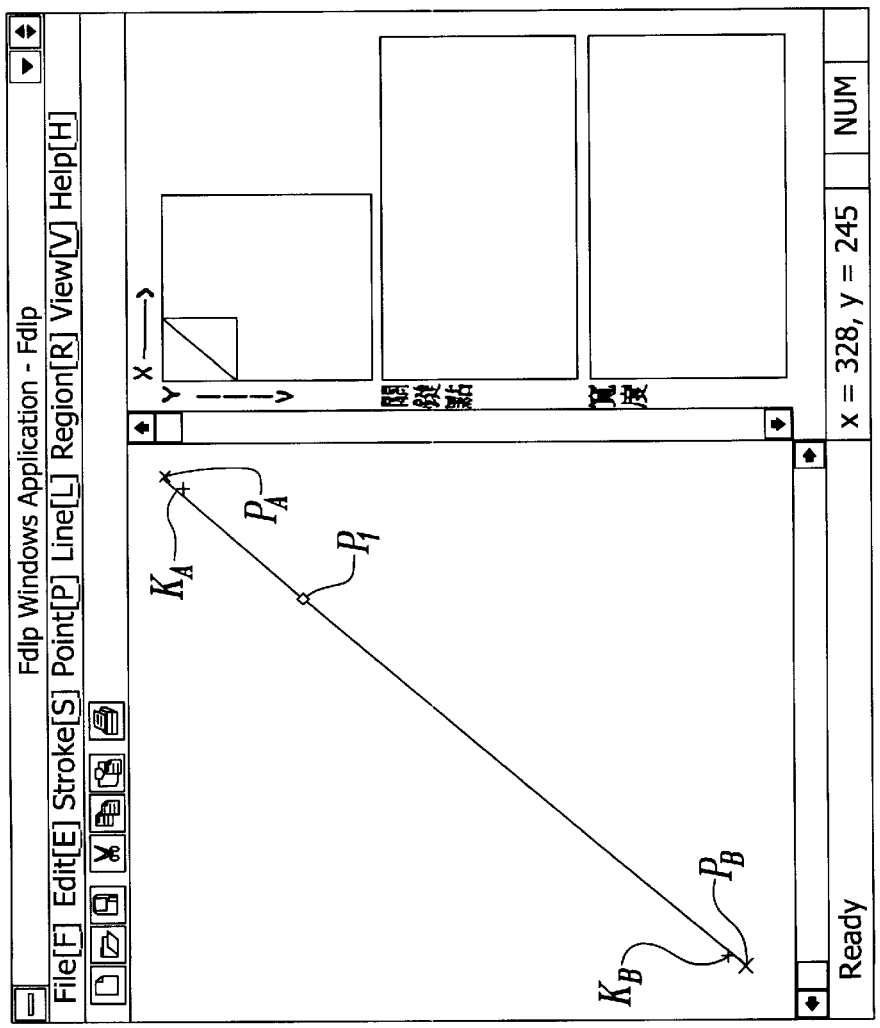

As shown in FIG. 3B, the font designer begins the process of describing curve segments for high and low resolution output devices. First, a font designer generates a curve segment between two feature points. Then, curve segments are described in greater detail by performing a split curve command for generating multiple midcontrol points between feature points. The split curve command generates a new midcontrol point between a previously generated portion of a curve segment. For example, in FIG. 3A, if the font designer wishes to further define the upper portion of curve segment 145, the font designer selects the split curve command for feature point $P_1$ and point 146. A cursor controlled midcontrol point is displayed to allow manipulation of a new curve segment between feature point $P_1$ and point 146.

In FIGS. 3B–3G, the font designer assigns generated curve segments to curve level codes. The font designer can define in greater detail a curve between two feature points by generating a greater number of curve segments between the two feature points. Greater detail is more important for generating a character for a high resolution display. A high resolution display requires greater detail for characters than a low resolution display would.

Each curve level code represents a set of midcontrol points or ratios assigned to levels of a tree-type data structure stored in memory that describes a curve between two feature points. See FIG. 3B described below. The font designer retrieves curve level window 147 and enters a curve level code into a curve level code block 149 within curve level window 147. In this example, the font designer has designated the curve level =0 with a single midcontrol point $P_1$ between feature points $P_A$ and $P_B$. Note that midcontrol point $P_1$ is located closer to feature point $P_A$ in work space area 65 of FIG. 3C.

Figure 3D:
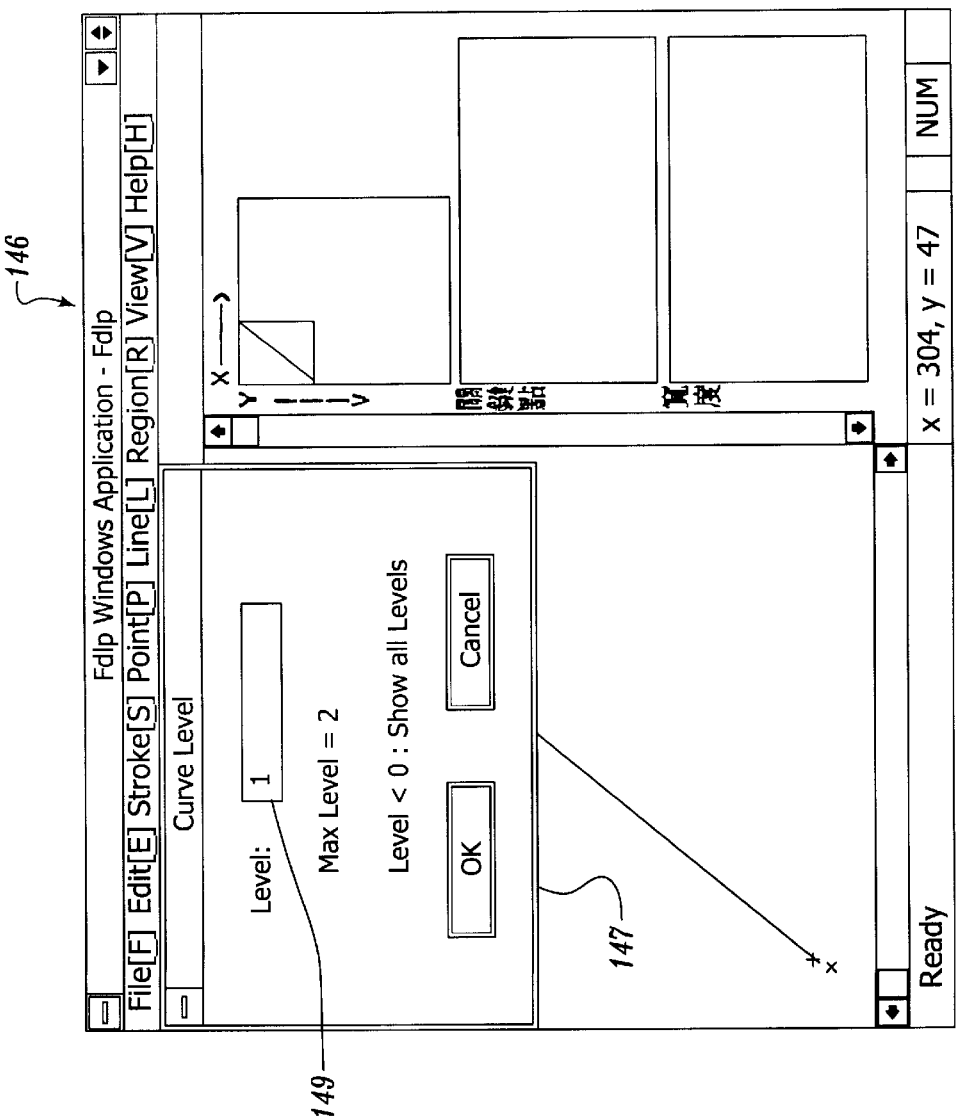
Figure 3E:
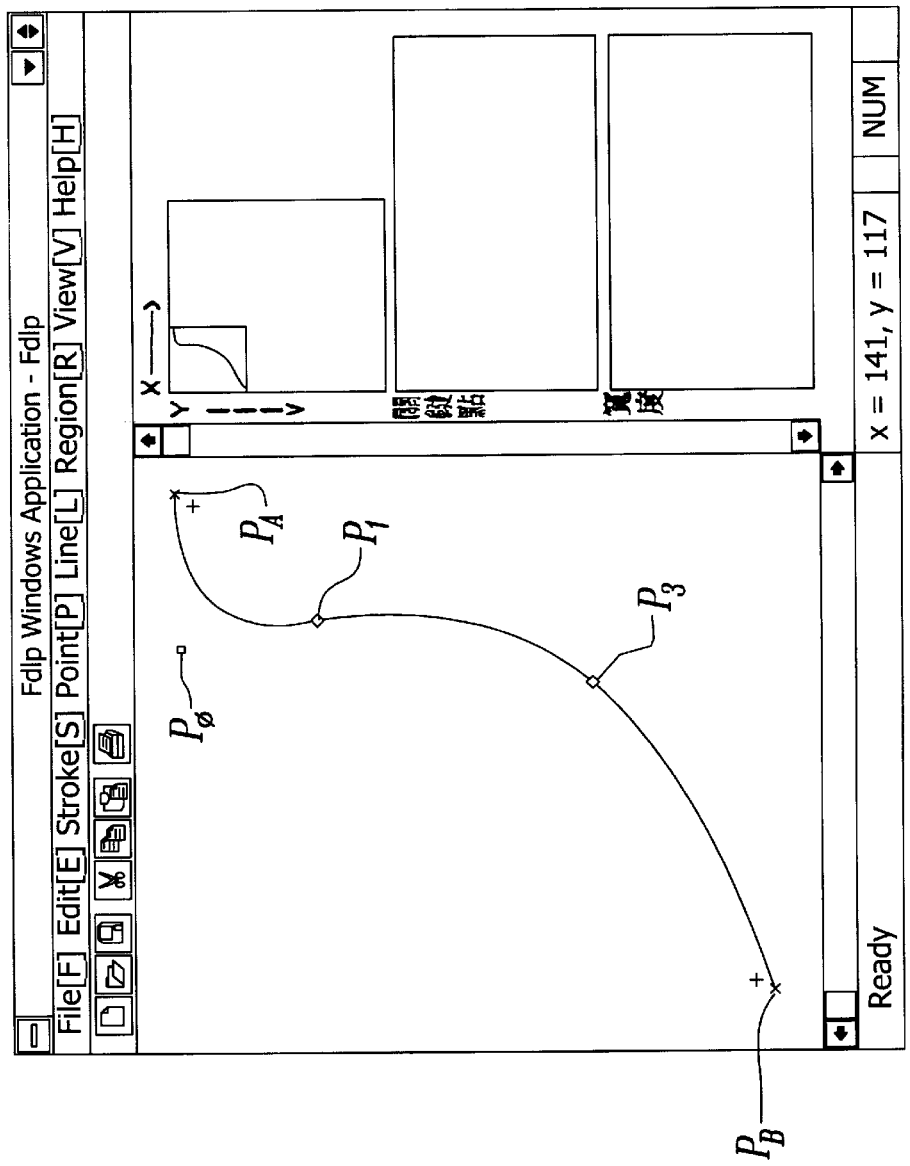
Figure 8H:
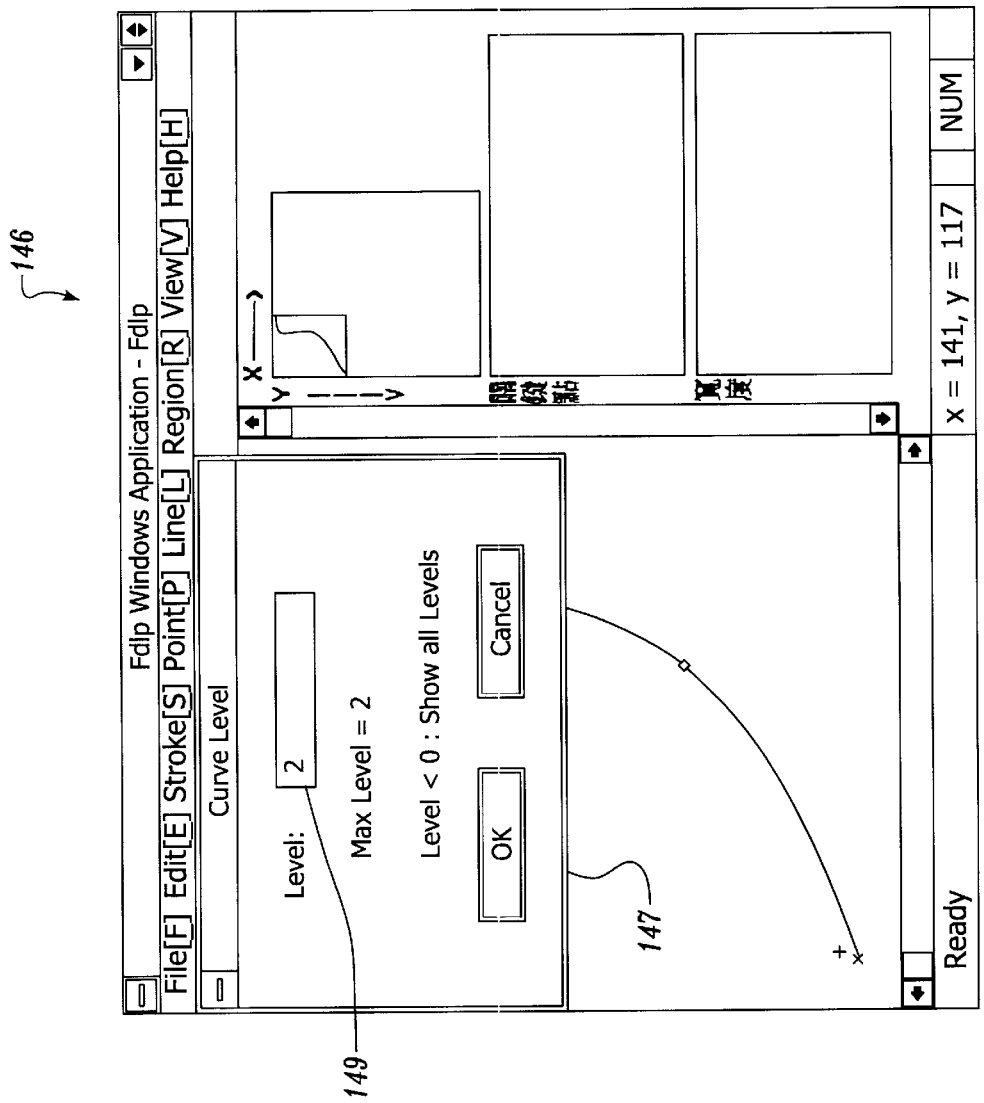
Figure 3G:
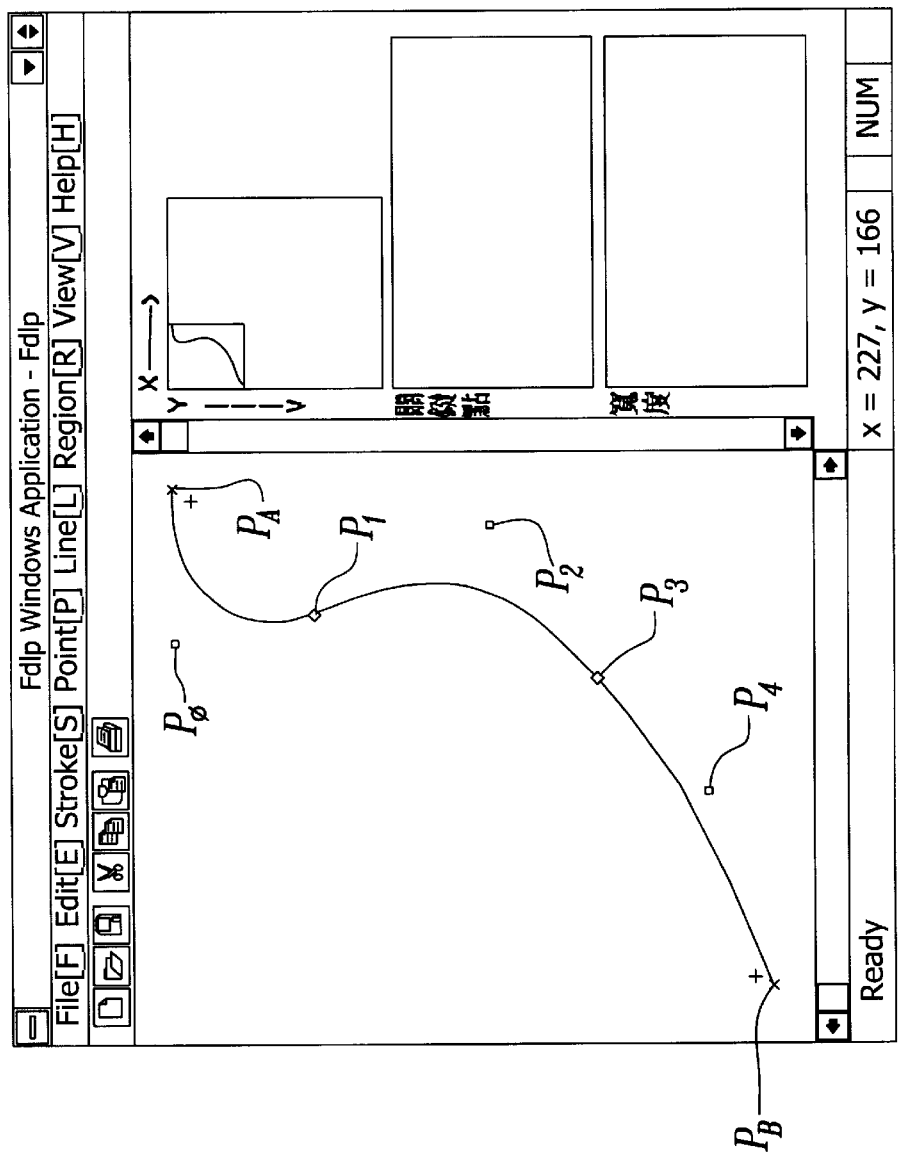
Figure 35:
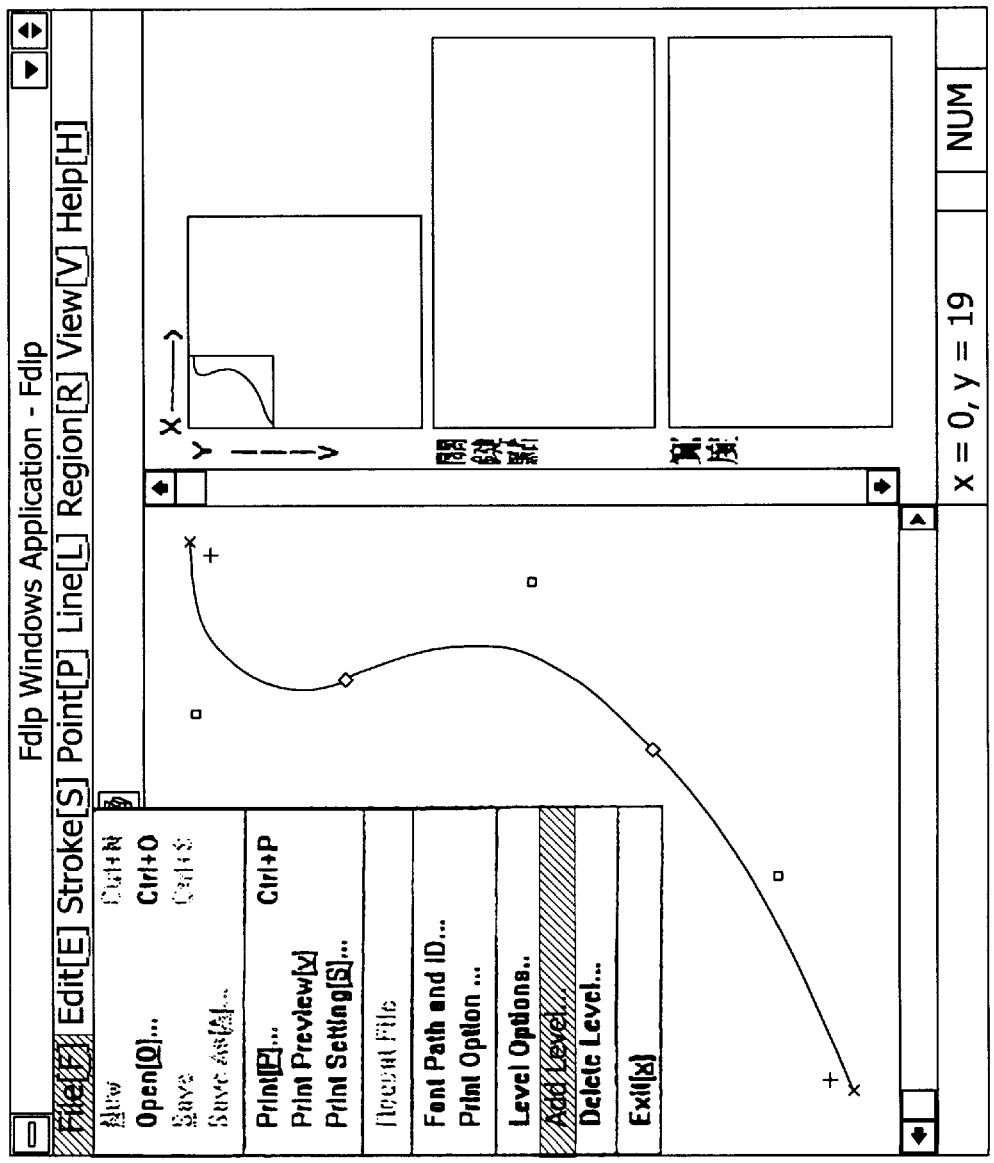
Figure 3F:
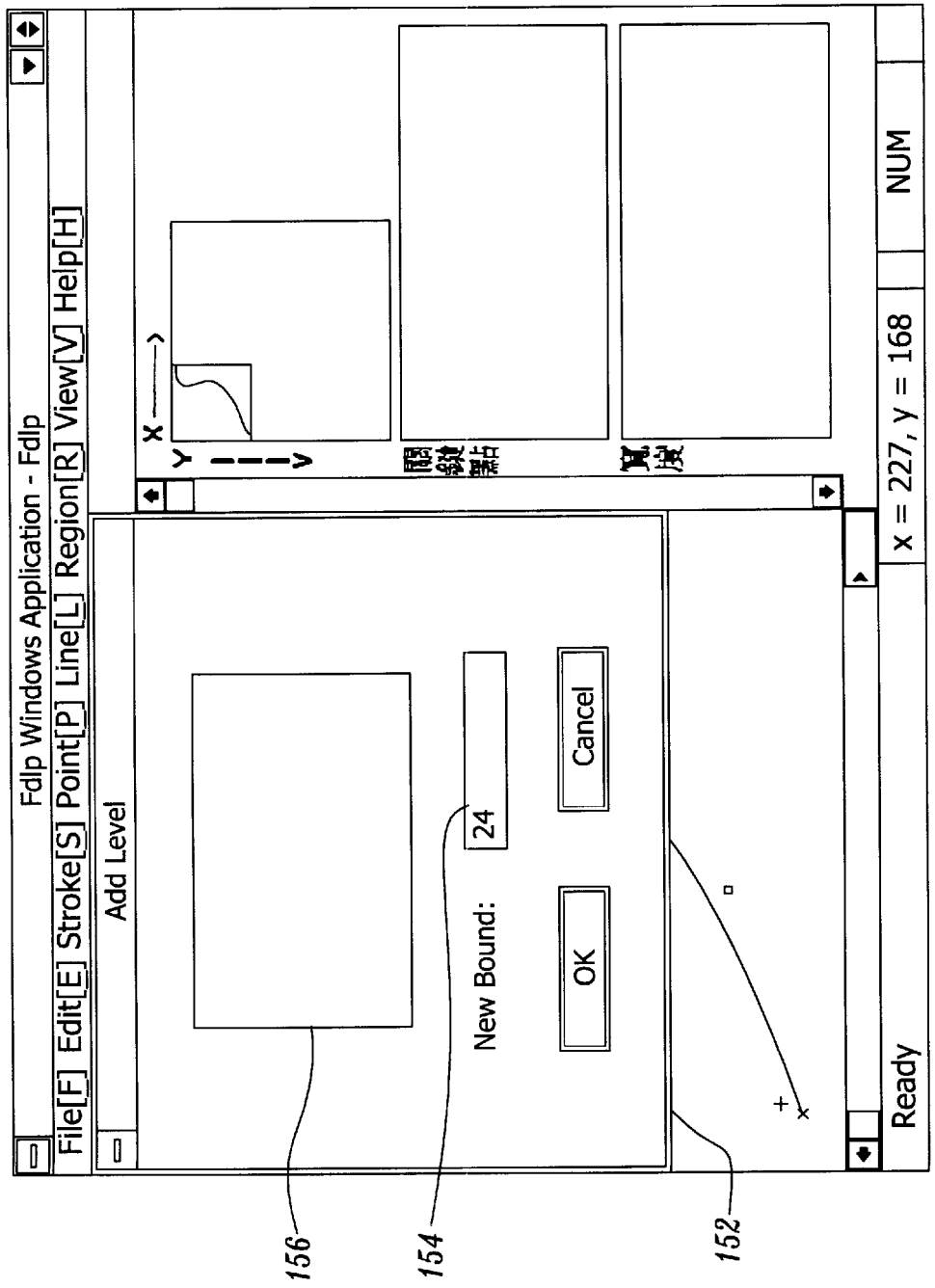

In FIG. 3D, the font designer defines curve level 1 within curve window 147. As shown in FIG. 3E, the curve segments between $P_A$ and $P_1$, and $P_1$ and $P_B$ are split and assigned two new midcontrol points, $P_0$ and $P_3$, respectively. Level 1 is ($P_A P_0 P_1$) for the first segment and ($P_1 P_3 P_B$) for the second curve segment. In FIG. 3F, the font designer completes curve level designation by designating the values for curve level 2 within curve level window 147. As shown in FIG. 3G, the font designer has split the curve segments between $P_1$ and $P_3$, and $P_3$ and $P_B$ with new midcontrol points, $P_2$ and $P_4$, respectively. The Level 2 is ($P_A P_0 P_1$) for the first curve segment, ($P_1 P_2 P_3$) for the second curve segment, and ($P_3 P_4 P_B$) for the final curve segment.

FIG. 3H illustrates the stored data for curve segment (code number 0) generated in FIGS. 3B–3G above as part of stroke (code number 0). The stroke is defined by two key points with character space values of (341,31) and (38,344), and width values of 10 and 20. Also, the referenced values of the two feature points (code numbers 0 and 1) are shown below the width values and key point values. The midcontrol points designated in FIGS. 3B–3G are stored according to their relative position or ratio from feature points $P_A$ and $P_B$, and are shown below the displayed referenced values of the two feature points. Below the displayed midcontrol point ratios is a visual comparison between the midcontrol point ratios shown in a tree structure 143 format and in an in-fix notation 144 format. Tree structure 143 illustrates the hierarchical relationship between the midcontrol point ratios between feature points $P_A$ and $P_B$. In Tree structure 143, the connecting lines between the midcontrol points and the feature points $P_A$ and $P_B$ illustrate pointers that are stored with each midcontrol point ratio. The pointers indicate the connection between each of the midcontrol point ratios, thus presenting the information for generating low to high resolution curves. The top level of the tree structure 143 ($P_1$) has been assigned to curve level 0, see FIGS. 3B and 3C. The second level of the top of tree structure 143 (including $P_0$ and $P_3$) has been assigned curve level 1 and so on. The feature points $P_A$ and $P_B$ are not assigned to a curve level, but are shown with pointers to them. When a curve level is designated for display, the midcontrol point ratios assigned to the designated curve level and all midcontrol point ratios above the designated curve level in the tree structure 143 are retrieved for curve generation. Thus, midcontrol point ratios are stored only once for various resolution displays, as shown by the in-fix notation 144. Therefore, storage space is optimized for multi-resolution display usage. The in-fix notation 144 is another way of illustrating the relationships shown in tree structure 143.

After each curve level is defined, as shown above in FIGS. 3B–3G, the font designer assigns each of these levels to specific bitmap boundaries. Essentially, the font designer is assigning a level of detail to a range of bitmap values by visually determining the least amount of curve information required for generating acceptable curve segments at each range of bitmap values. For example, if a curve segment displayed on a low resolution display appears the same whether it is defined by a single midcontrol point ratio or multiple midcontrol points, the font designer determines that it is wiser to define the curve segment by the single midcontrol point ratio therefore saving display processing time.

Figure 3K:
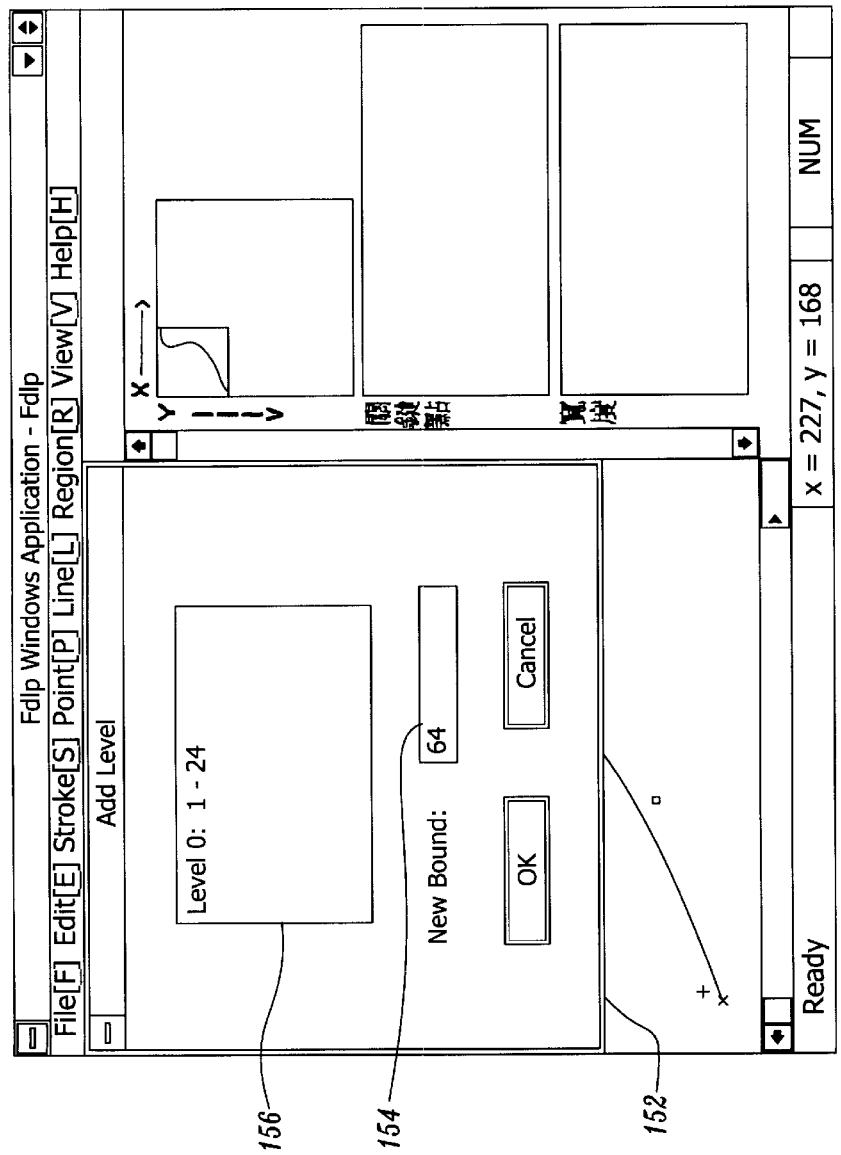
Figure 3L:
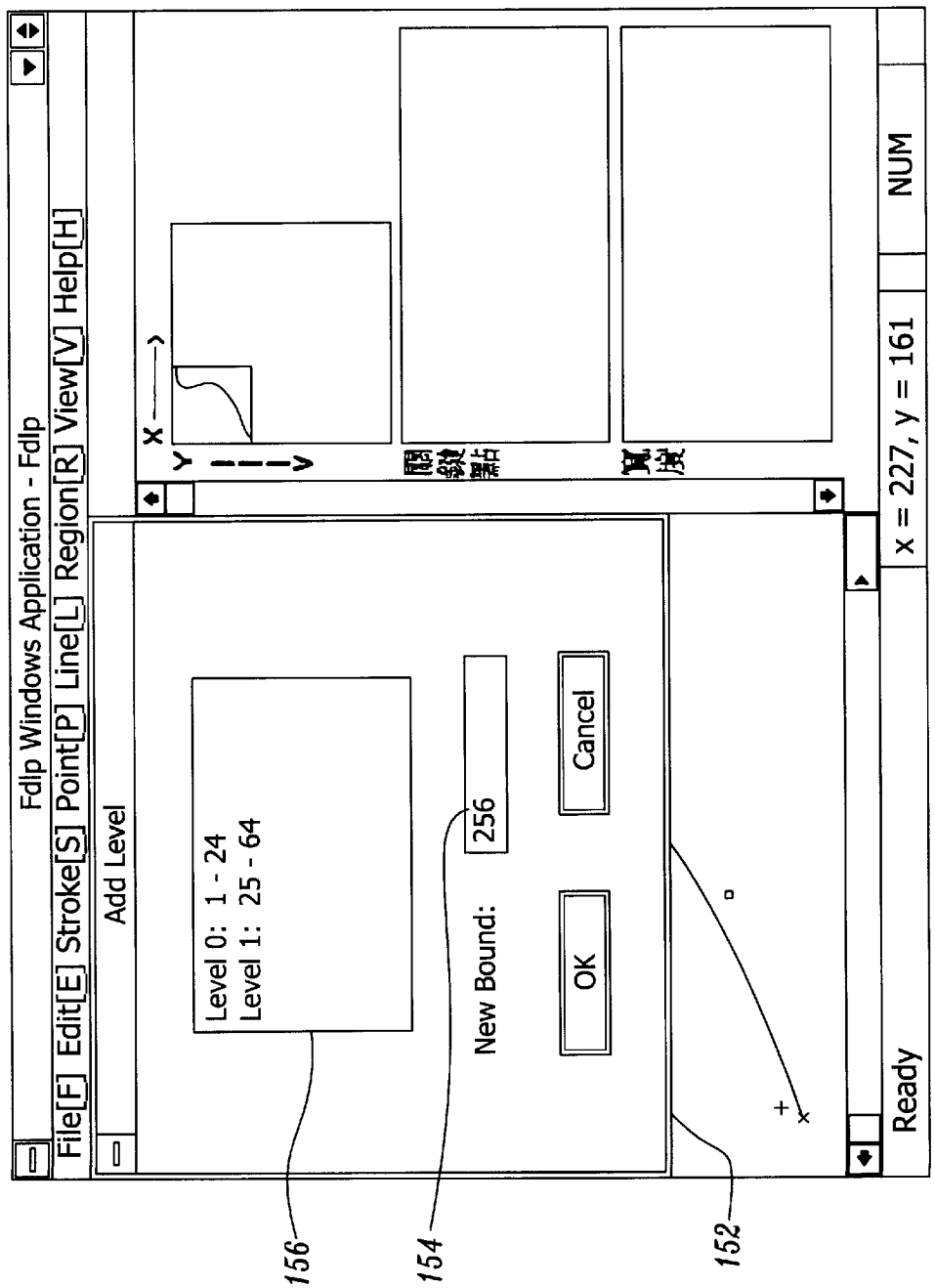
Figure 3M:
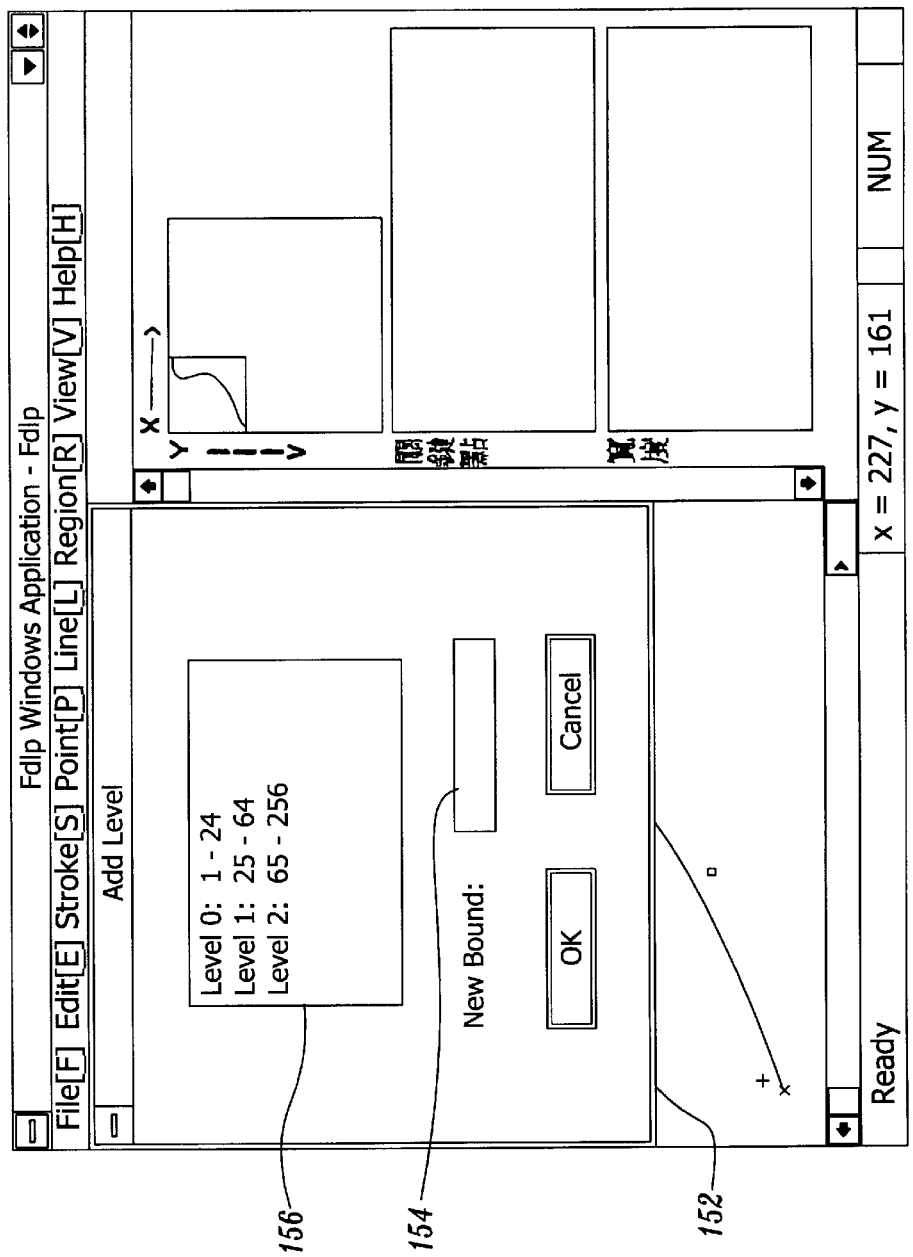
Figure 6:
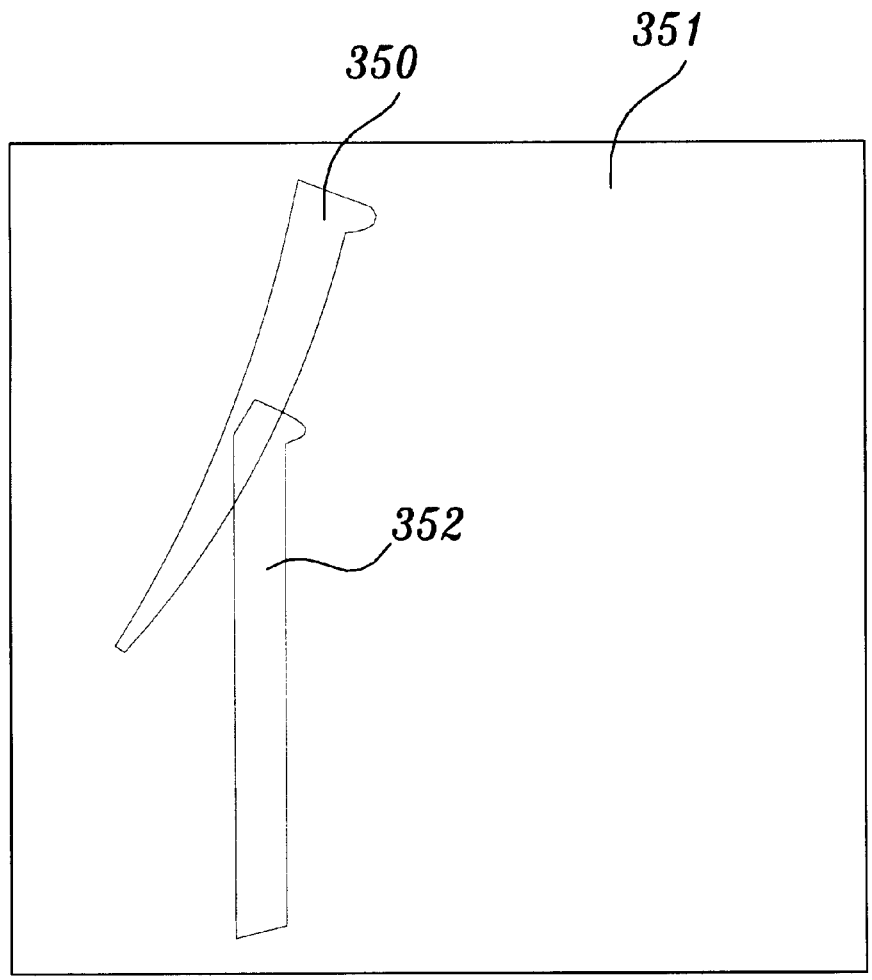

As shown FIG. 3I, the font designer selects Add Level command 150 from a pull-down menu of the main menu of the CAD tool to begin designating boundaries for the stored levels. As shown in FIG. 3J, the Add Level command 150 accesses an overlay Add Level window 152 which includes a boundary designation block 154 and a level number bitmap boundary display area 156. The level bitmap boundary display area 156 displays the stored level number and which bitmap boundaries are assigned to the shown level. In the example of FIG. 3J, the font designer has entered bitmap value 24 into the bitmap boundary designation block 154, thus assigning all bitmap values up to and including 24×24 to Level 0, as shown in the display area 156 in FIG. 3K. In FIG. 3K, the font designer enters upper bitmap level boundary =64 into the boundary box 154, thus assigning bitmap values between 25 and 64 to Level 1, as shown in display area 156 of FIG. 3L. Finally, in FIG. 3L, the font designer enters the bitmap value 256 into bitmap boundary block 154, thus assigning all bitmap values between 65 and 256 to the last stored level, Level 2, as shown in display block 156 of FIG. 3M.

In the first step of the process in FIG. 2A, at block 302, a font designer retrieves a previously generated set of stroke-based characters. The set of stroke-based characters are preferably the same font type. If the stroke-based characters are Chinese characters, the following are examples of different Chinese character fonts a designer may choose from: text hand; running hand; cursive hand; seal type; Sung-type; and Ming-type.

Next, at block 304, a group of similar glyphs are identified from the set of stroke-based characters. The step of identifying is as simple as a font designer visually scanning the set of stroke-based characters, or automatically scanning the set of stroke-based characters by image analysis techniques for glyphs with similar topography. Then, at block 306, the most commonly appearing glyph of a group of glyphs that have a similar topography is selected. This step can also be performed manually or automatically. All intersecting points for all overlapping strokes in the selected basic glyph are determined. See block 308. Intersections between strokes can be determined by manually selecting the points at which the outlines of the strokes intersect or can be automatically determined using an intersecting algorithm. Since outlines of strokes are predefined as Bézier curves, the intersecting algorithm can easily determine the curve or subcurve segments of a first stroke that intersect with the curve or subcurve segments of a second stroke within the glyph.

The system is now prepared to generate outline patterns for the selected basic glyphs with determined intersection points. This is accomplished by applying a stroke overlap removal algorithm. See block 310. The stroke overlap removal algorithm produces an outline representation of the basic glyph whether it includes overlap strokes or not. The stroke overlap removal algorithm traces the Bézier curves of each stroke in the basic glyph. When the curve tracing on a first stroke reaches a determined intersecting point, the stroke overlap removal algorithm continues tracing onto the second overlapping stroke. The direction in which the tracing continues onto the second overlapping stroke depends upon the tracing direction on the first stroke. For example, if the tracing is moving counter-clockwise around a first stroke and reaches an intersecting point, the tracing continues in a counter-clockwise direction on the second overlapping stroke. This technique properly traces the outline of a basic glyph. A basic outline glyph is generated upon completion of the step in block 310. At decision block 312, basic outline glyph generation is complete when all the glyphs are represented by one basic outline glyph. A glyph is properly represented by a generated basic outline glyph when the stroke overlaps occur at the same curve or subcurve on the glyph's strokes. Then, at block 314, characters are generated for display on an output device having a predefined L-level of resolution. Characters are reconstructed from the glyph construction described above. The character reconstruction process is described in FIG. 2B below.

As shown in FIG. 2B, the character reconstruction process begins by the selection of a character of a selection for display (block 320). Character selection may occur a number of different ways, for example, if a document is selected for display, all the characters within the document are automatically selected. Next, at block 322, the prestored pregenerated glyphs that are associated with the selected character are retrieved. Then, at block 324, the selected character is generated by rendering the retrieved stroke-based glyphs according to predefined explicit and implicit data of the retrieved stroke-based glyphs and the level of resolution of the output display device. The explicit data includes key points and width values of the one or more strokes that define a glyph and the implicit data includes feature points and curve values for each stroke of the glyph. The feature points, curve values, and level of resolution of the output device define curve segment intersection information for each stroke outline intersection of a glyph. At block 326, the rendered glyph is displayed at a display space location different from the glyph's prestored display space location according to the level of resolution of the output device. The step in block 326 is described in more detail below with respect to hinting.

FIG. 4 illustrates a predefined basic stroke 340. Basic stroke 340 includes key points K0 and K1, a width W0, feature points F0–F2 and curve control points P0–P8. The number of control points present for defining the curves and subcurves of a basic stroke depend upon the level of resolution required for rendering. The diamond shaped control points P0, P2, P4, P6 and P8 define curve points of subcurves defined by square-shaped control points P1, P3, P5 and P7. Stroke 340 is apparently prepared for rendering to a high level of resolution device, as indicated by the numerous control points P0–P8 for describing the connection between feature point F0 and feature point F4. An example of a high level of resolution device is a laser printer. An example of a low level of resolution device is a dot matrix printer.

FIG. 5 illustrates an example process of creating glyph-based outline characters from stroke-based characters. As shown in FIG. 5, the rows include characters that appear to have common overlapping strokes or a common glyph. Each row includes characters that include a glyph identified by the same strokes. For example, each character in row A includes the two stroke glyph 351 identified by the strokes 350 and 352. The other rows include characters with similar glyphs to the more common glyph 351 that appears in the characters in row A. However, the glyphs in rows B–D are identified by different stroke pairs. If the characters displayed were the only characters in which this type of glyph appeared, the glyphs 351 in row A would be manually or automatically selected, because the stroke pair 350 and 352 appears more frequently than the other stroke pairs. Thus, as better seen in FIG. 6, the glyph 351 with basic strokes 350 and 352 is selected as the basic glyph for initially representing the commonly featured glyphs in the characters displayed in FIG. 5.

Figure 7A:
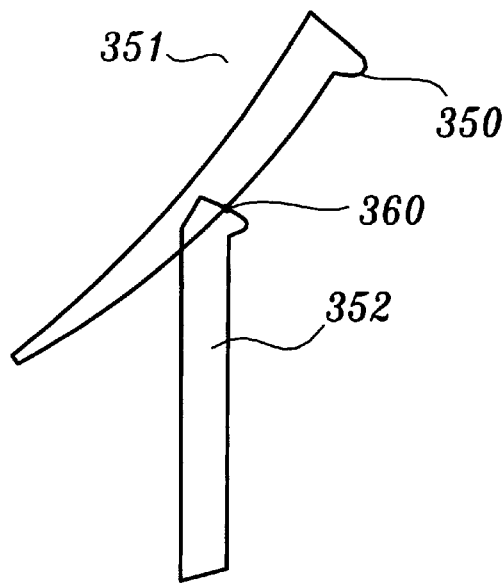
Figure 7B:
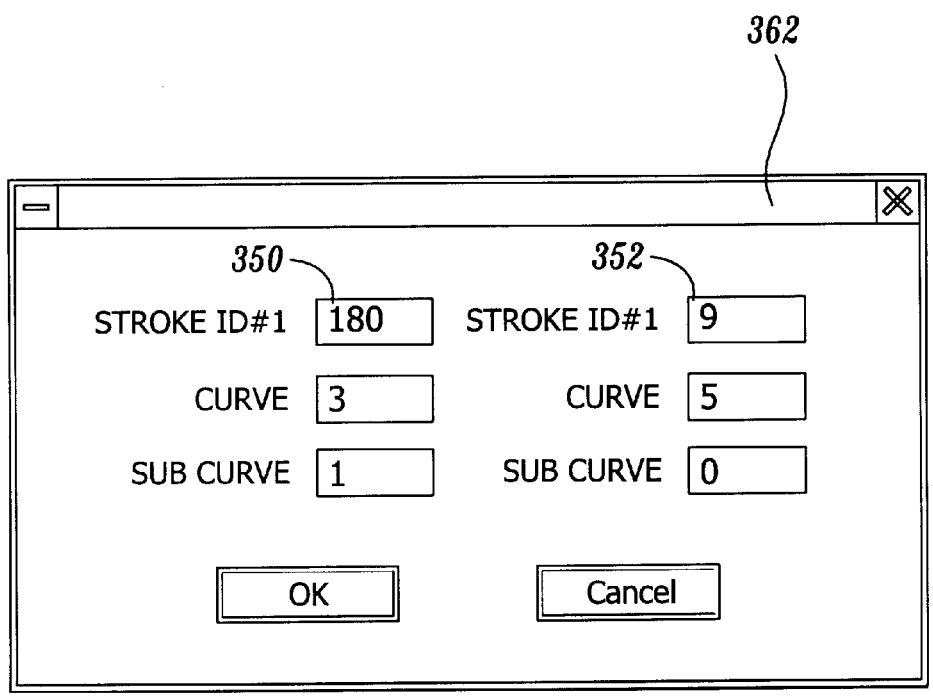

FIG. 7A illustrates the identification of a first intersecting point 360 between strokes 350 and 352 of the selected basic glyph 351. Window 362 illustrated in FIG. 7B displays the stroke numbers and the curve and subcurve location of the identified intersection. In this example, window 362 indicates that the stored identification number for stroke 350 is 180 with the first intersection point 360 occurring at curve 3 and subcurve 1. Also, the second stroke's 352 identification number is 9 with the intersecting point 360 occurring at curve 5 and subcurve 0 (0 indicates that no subcurve exists for the curve segment). Once all the curve and subcurves for the intersections between the strokes are determined, they are compared to the similar glyphs, as shown in rows B–D in FIG. 5. If the curve and subcurves that intersect are different on the similar glyphs, a new basic glyph must be generated for properly identifying the glyphs with different curve and subcurves identified at the intersecting points. Otherwise, only different basic stroke numbers are recorded as the explicit font data.

Figure 8A:
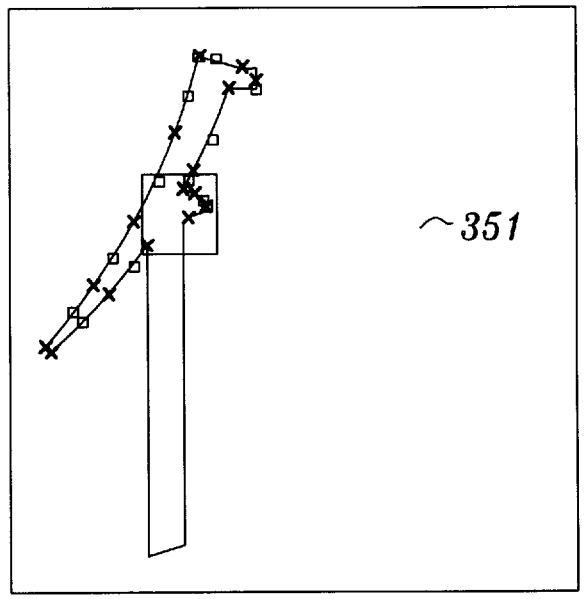
Figure 8B:
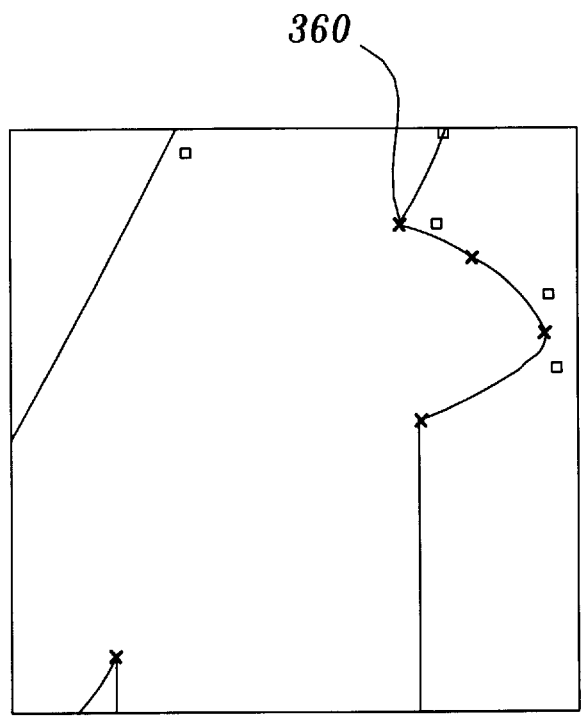

FIGS. 8A and 8B illustrate the basic outline glyph 351 after the overlapping removal algorithm has been executed. The overlapping lines are not traced and thus their information is not retained.

Figure 9:
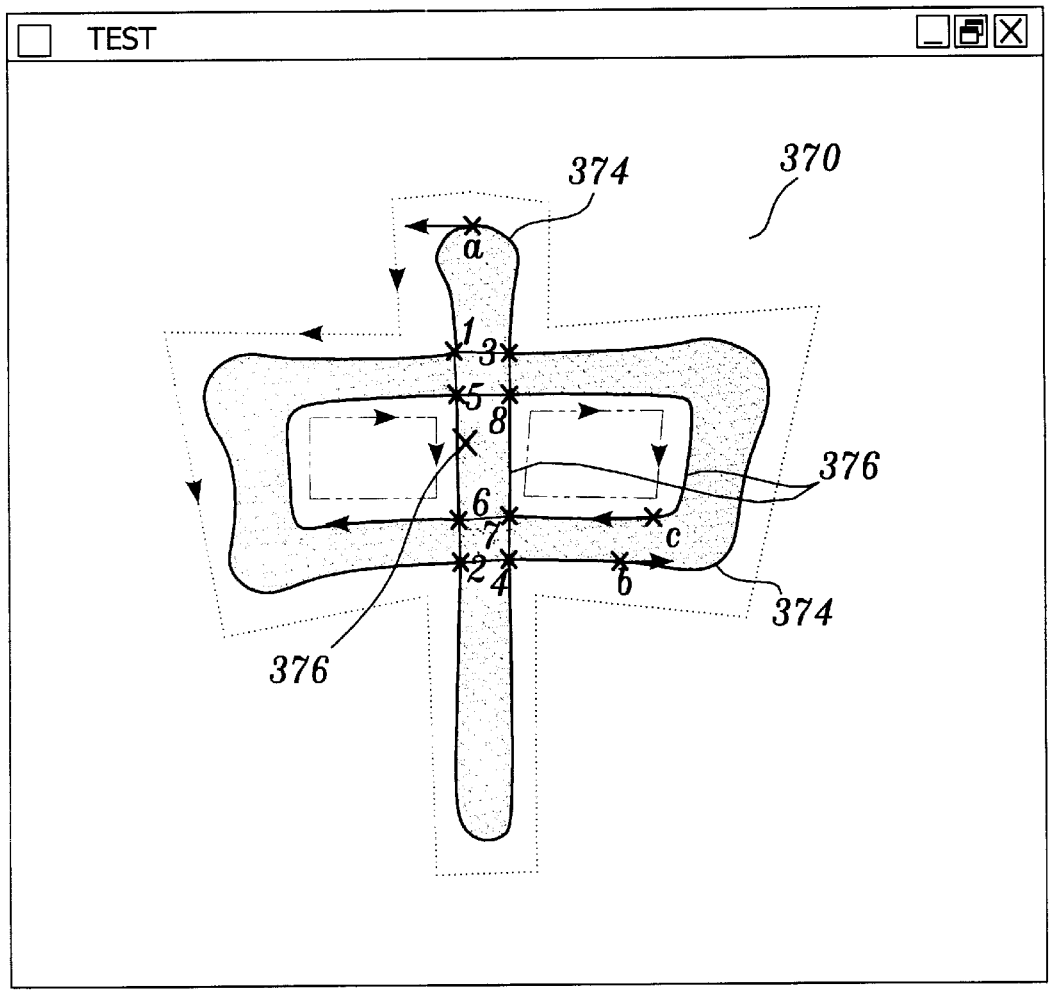
FIG. 9 illustrates a technique for character rendering.

In one embodiment, the stroke removal algorithm is a non-zero winding rule. The non-zero winding rule is a procedural rule for determining the direction of tracing the outlines of strokes of a glyph and the shading of a basic glyph. The non-zero winding rule is either a right hand rule or a left hand rule. In the example of FIG. 9, the left hand rule is used for tracing glyph 370. According to the left hand rule, all outside glyph outlines are traced in a counter-clockwise direction, see outline 374, and all inside glyph outlines are traced in a clockwise direction, see outline 376. The left hand rule also states that the filled region always lies on the left hand side of the direction in which a contour is traced. The left hand side of the outlines 374 and 376 is the shaded area.

HINTING

A font designer or user assigns hints to key points to increase the display quality of strokes of the constructed font in low resolution space. Hint information modifies stroke shapes to avoid jammed strokes and maintains symmetry of strokes in the viewing space during character rendering. In order to assign hint information, the font designer or user simply labels which key point(s) of a stroke requires hinting.

Figure 10A:
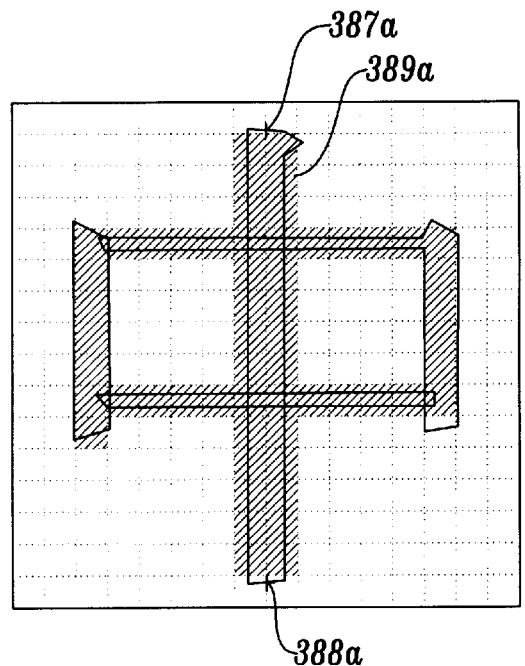
FIGS. 10A and 10B are illustrations of a bitmap character with unlabeled and labeled key points, respectively.

Hint information is used during the display of key points. A key point with hint information is moved to the center of the display cell (pixel) in which it appears. FIGS. 10A and B illustrate the contrast of unlabeled and labeled key points. In FIG. 10A, key points 387a and 388a are unlabeled. Thus, the outline of stroke 189a activates two columns of display cells in the low resolution space, because the outline covers at least 50% of the display cells of two columns.

Figure 10B:
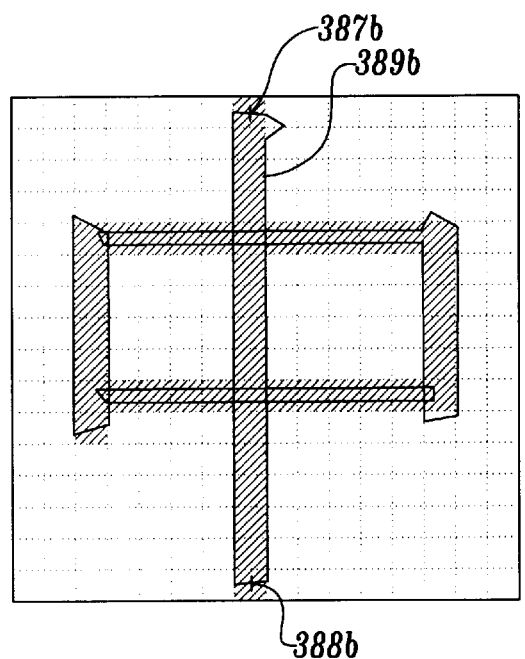

In contrast, as shown in FIG. 10B, key points 387b and 388b are labeled and the key points are moved to the center of the display cell. Thus, stroke 389b maintains a stroke width of one display cell, because the key points 387b and 388b are moved to the center of display cells of the same display cell column. The outline of stroke 389b activates only one column of pixels.

Figure 11A:
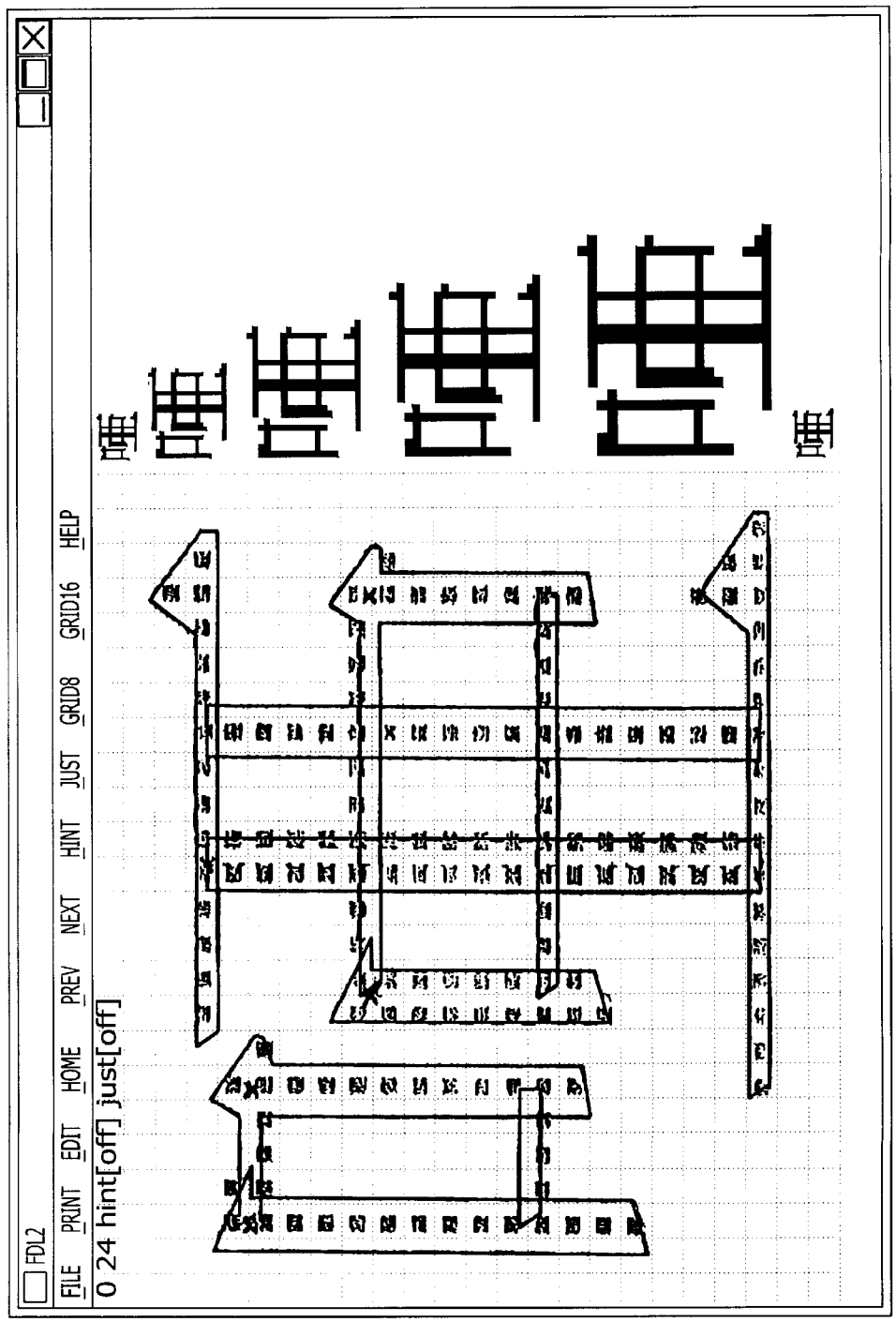
FIGS. 11A and 11B are screen shots illustrating nonadjusted strokes and adjusted strokes, respectively.
Figure 11B:
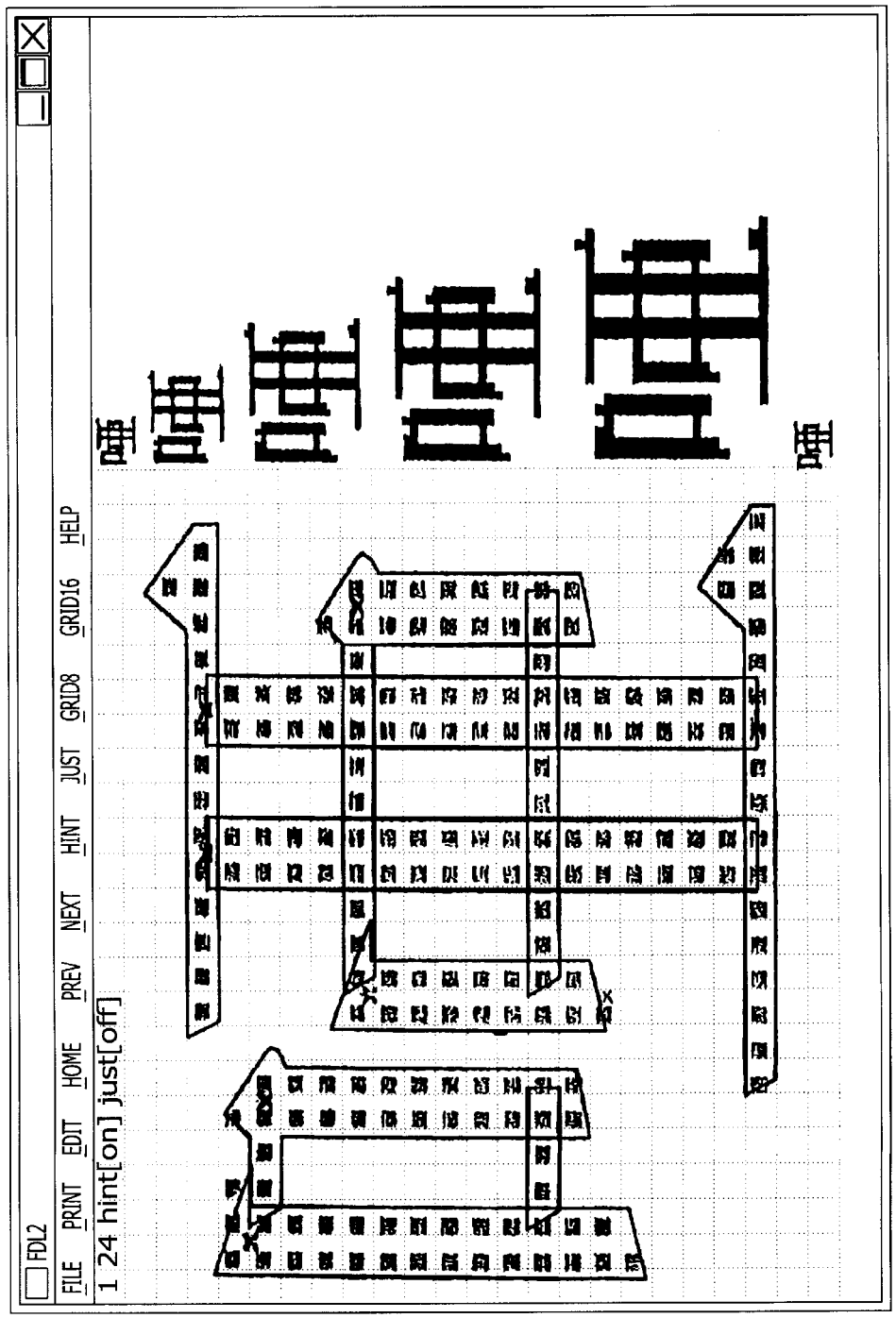

FIG. 11A illustrates another technique performed when hinting is activated. As shown in FIG. 11A, all the vertical strokes are approximately the same width of two pixels. However, some of the stroke outlines activate only a single column of pixels and others activate two pixel columns. In order to maintain consistency for like-widthed strokes, a stroke's width dimension and number of pixels is first determined. If the determination results in an odd pixel value, the key points of the stroke are positioned to the center of the pixel in which they are initially located, otherwise, the key point is adjusted to the nearest grid line (line separating pixels) parallel to the lengthwise dimension of the stroke. As shown in FIG. 11B, all the key points of the vertical strokes have been adjusted to the nearest grid line, thereby keeping the vertical stroke widths consistent throughout the character.

STROKE ADJUSTMENTS

Low-resolution displays may at times cause parallel strokes in a character to overlap or cause multiple parallel strokes to be improperly balanced; for example, a middle stroke closer to a left stroke than a right stroke. FIGS. 12–14 illustrate these problems that may occur and the solution according to the present invention.

Figure 12A:
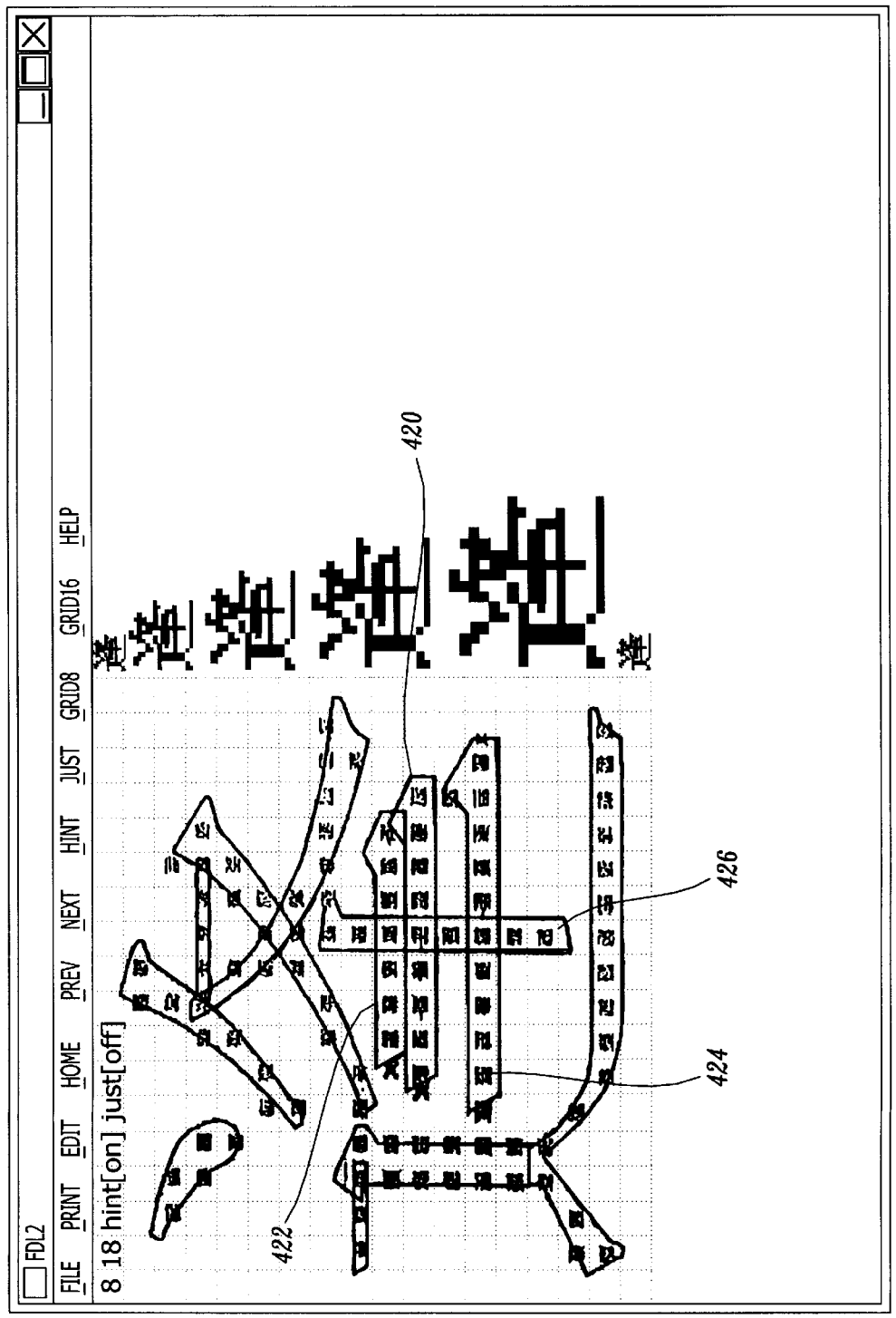
FIGS. 12A and 12B are screen shots illustrating overlapped strokes and corrected nonoverlapped strokes in a character, respectively.
Figure 12B:
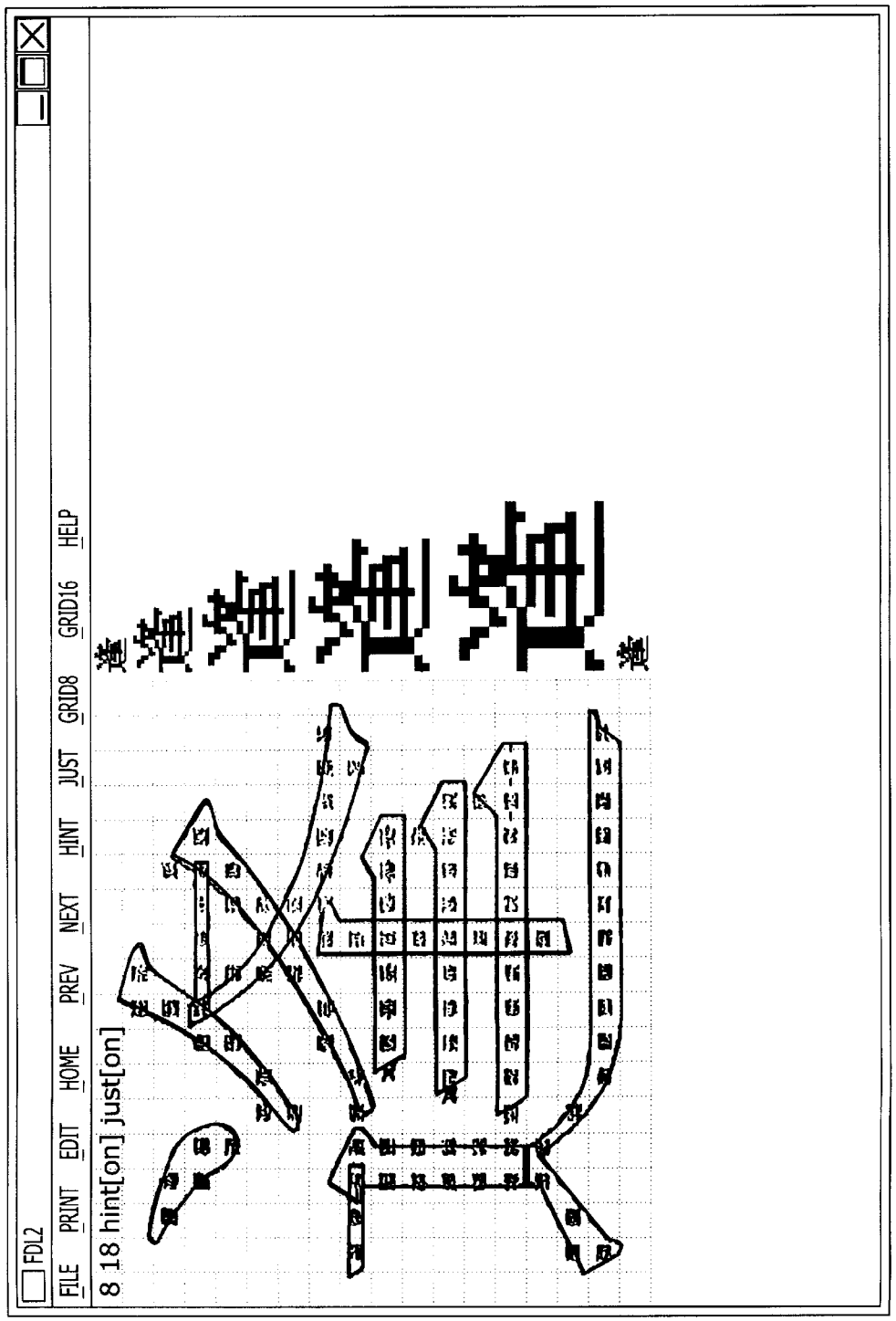

As shown in FIG. 12A, an overlap has occurred between two horizontal strokes 420 and 422. This situation is unacceptable because the viewer sees strokes 420 and 422 as a single stroke. The following rules resolve the possible occurrence of an overlap. Three strokes 420, 422 and 424 are illustrated in parallel and must not overlap each other. The first rule is that the top stroke is allowed to move up one pixel. The second rule is that the bottom stroke is allowed to be moved down one pixel. The procedure thus follows: if an overlap of strokes is detected, first check if the lower stroke can be moved down one pixel; otherwise, move the top stroke up one pixel. A stroke may not be moved up or down if it fails to fulfill a predefined criteria. In the example of FIGS. 12A and B, the criteria is that the horizontal strokes must maintain at least a one pixel distance from the end of vertical stroke 426 of which they make contact. FIG. 12B illustrates the displayed result of the procedure described above.

Figure 13A:
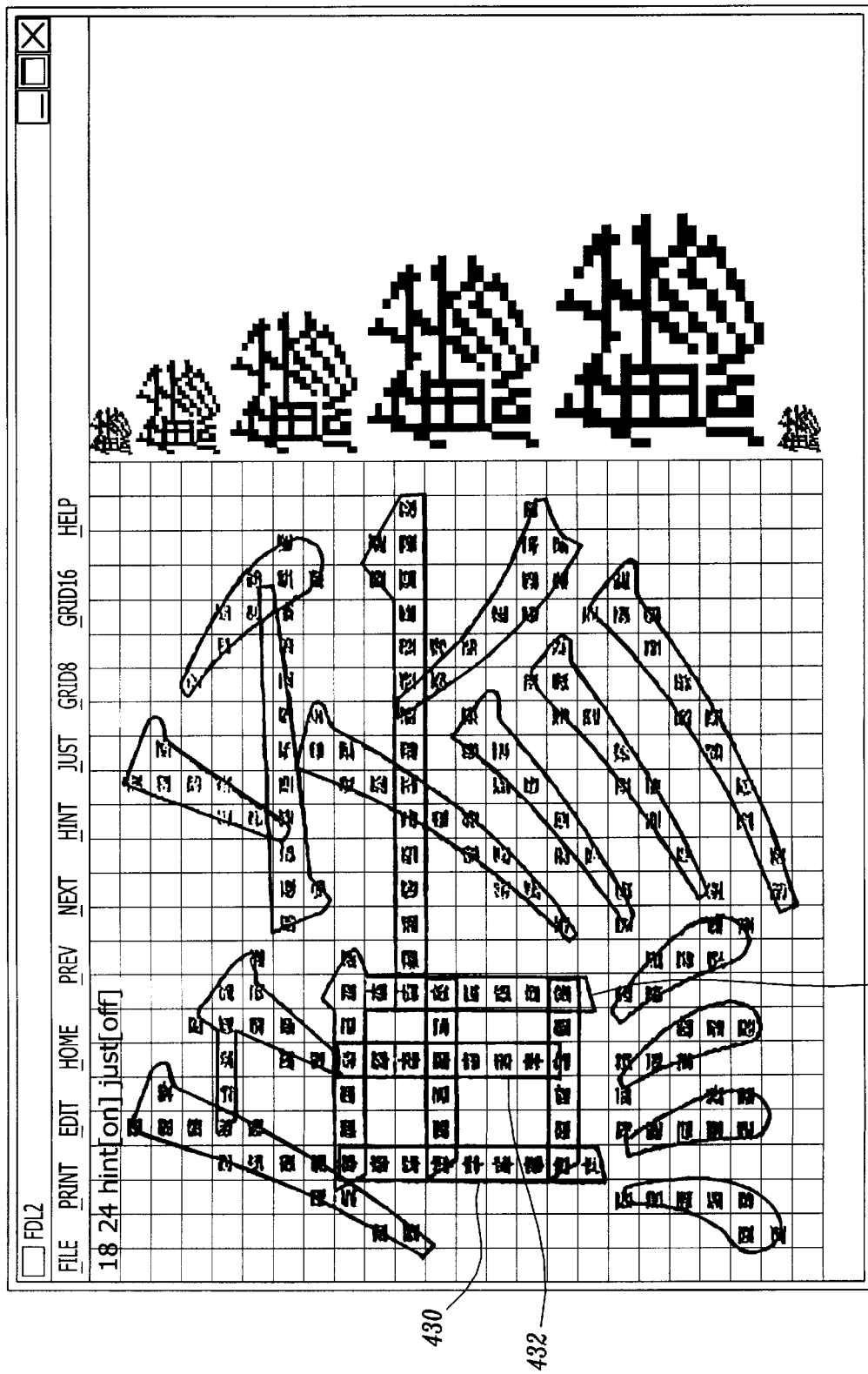
FIGS. 13A and 13B are screen shots illustrating three unbalanced strokes and three balanced strokes in a character, respectively.
Figure 13B:
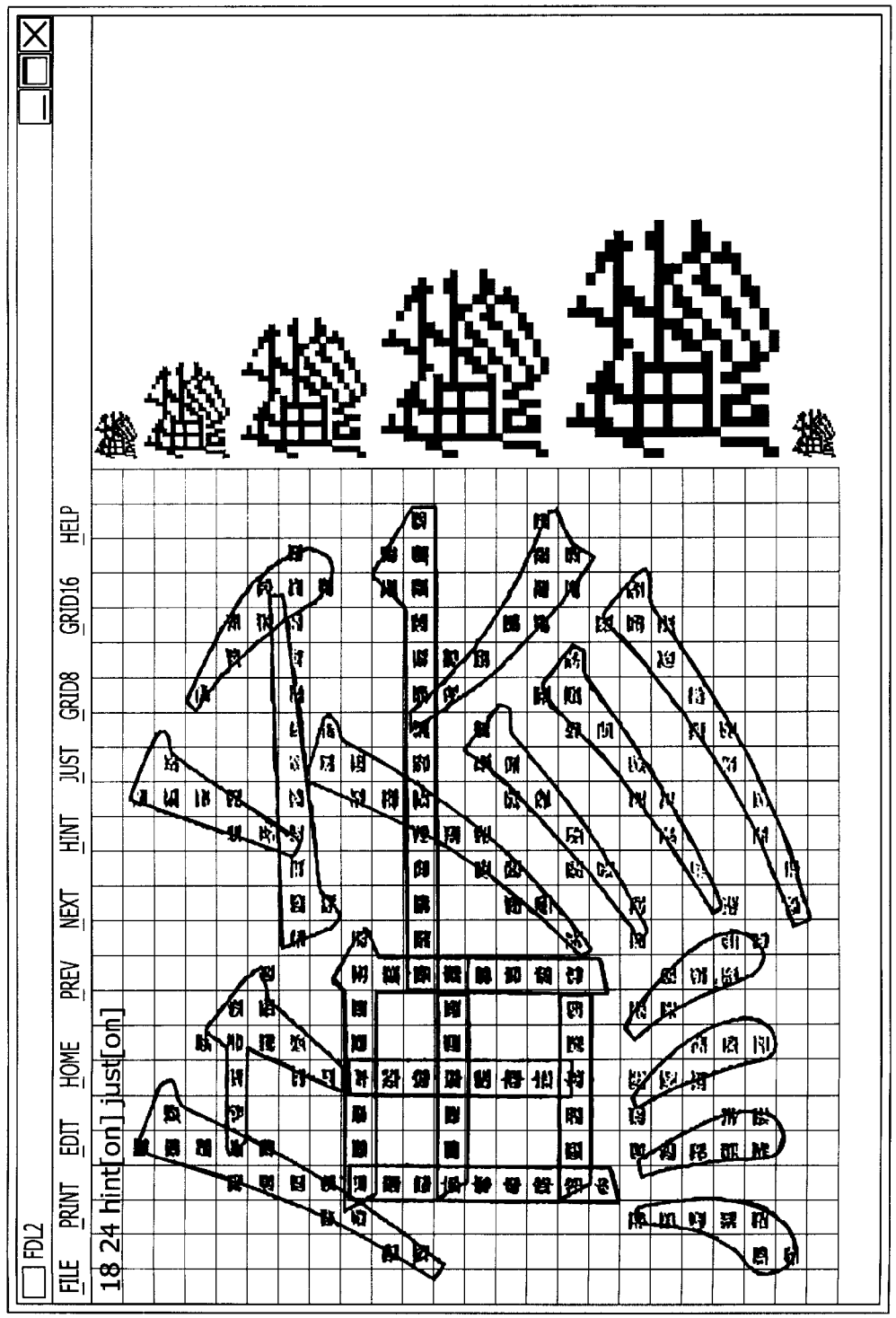

As shown in FIG. 13A, vertical strokes 430, 432 and 434 are displayed in the character shown with the center stroke 432 one pixel distance closer to right vertical stroke 434 than to left stroke 430. However, in this particular character, the vertical strokes 430, 432 and 434 must maintain symmetry (equal white space between the strokes). The following procedures are invoked if this situation occurs. First, the character is checked to see if the smaller white space can expand. If the smaller space between the strokes cannot be expanded, the larger space between the strokes is reduced to equal that of the smaller space. In the example of FIG. 13A, right stroke 434 is moved one space to the right to make the white space between it and the center stroke 432 equal to two pixels, thus equal to the pixel space between center stroke 432 and left stroke 430. If right stroke 434 had no room to move, left stroke 430 would have moved one pixel closer to center pixel 432, thus making the spaces between the strokes equal. FIG. 13B illustrates the result of the procedure just described.

Figure 14A:
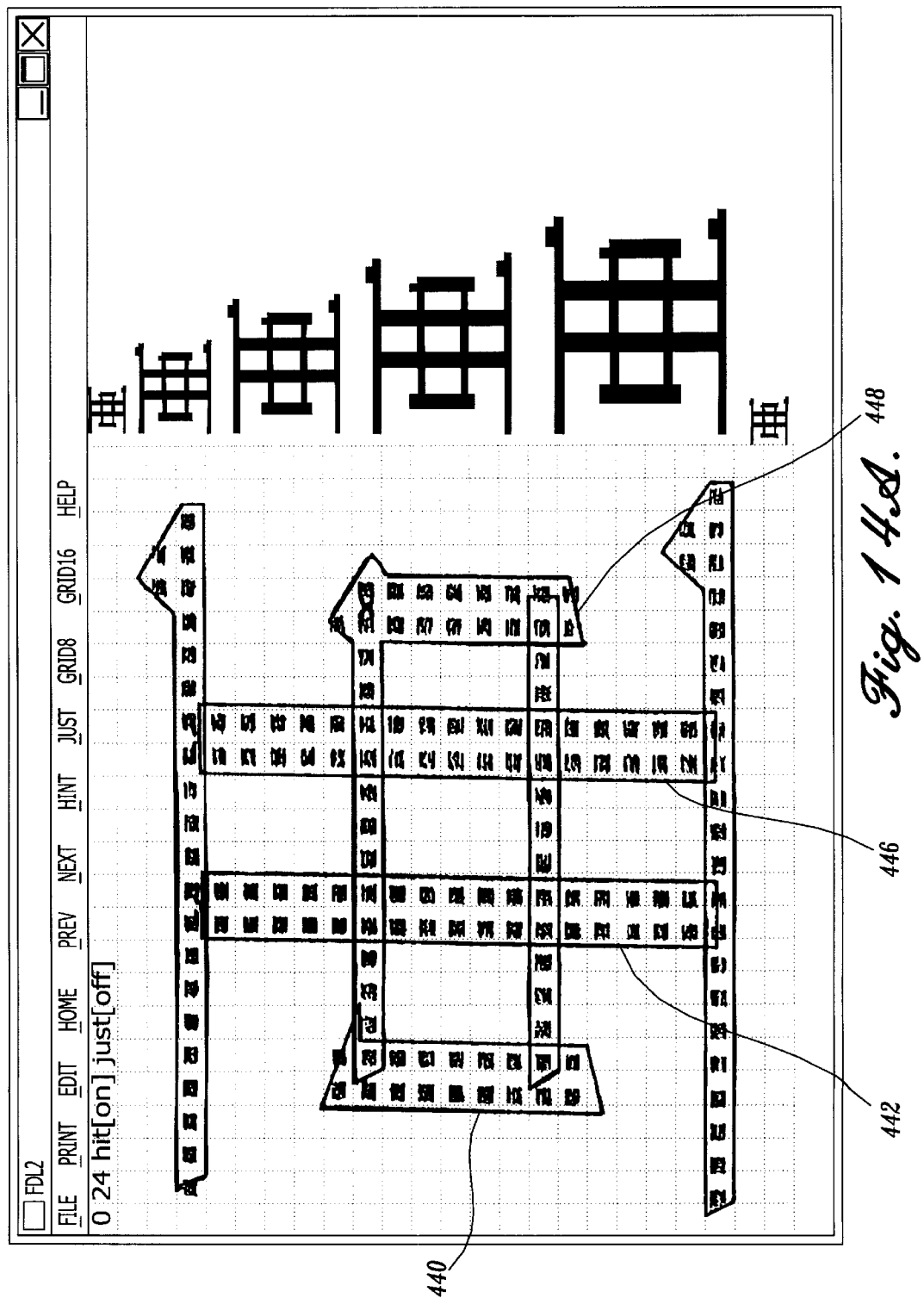
FIGS. 14A and 14B are screen shots illustrating four unbalanced strokes and four balanced strokes in a character, respectively.
Figure 14B:
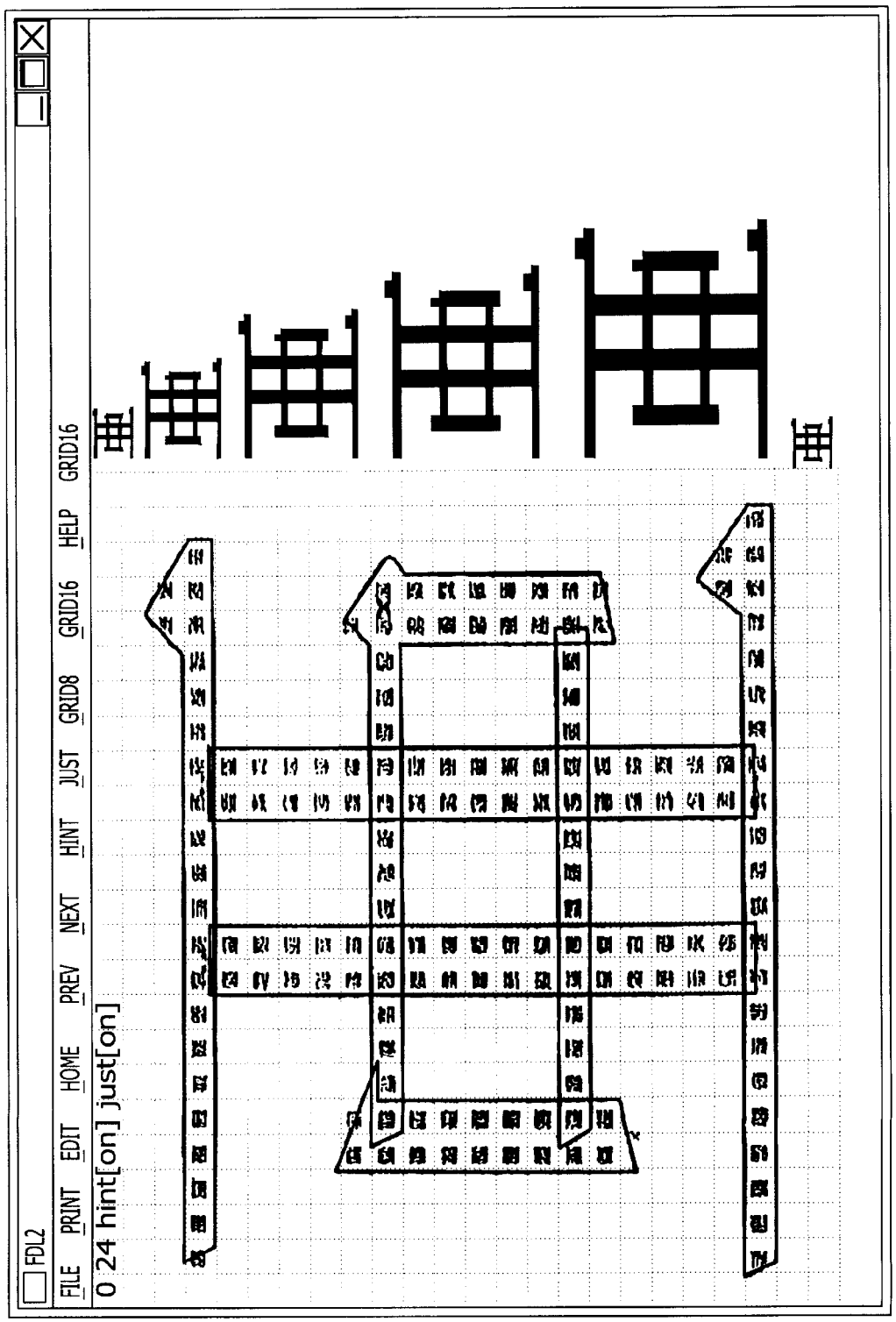

FIG. 14A illustrates an inconsistency that may occur with four parallel strokes that must be displayed with equal spacing. The spaces between the two center vertical strokes 442 and 446 and the space between the left stroke 440 and center stroke 442 equals three pixel widths. However, the space between center stroke 446 and right stroke 448 is equal to two pixel widths. The same procedure applies as that described above for the three parallel stroke situation. However, there is just one more stroke that must be moved in case of a display error. FIG. 14B illustrates that the right stroke 448 had enough space within the character space to move and make the space between right stroke 448 and center stroke 446 equal to three, thereby producing equal spaces between the vertical strokes.

Low resolution displays may at times cause parallel strokes in a character to overlap or cause multiple parallel strokes to be improperly balanced. For example, a middle stroke is placed closer to a left stroke than a right stroke or the stroke is too thin or thick because of the location of the strokés key point. Since a glyph is defined by strokes, the display of glyphs can be adversely affected in low resolution displays. The strokes of a glyph are identified by a specific location in character space. When a glyph is displayed with a low resolution character space, the strokes may produce a distorted glyph. In order to avoid distorted glyphs, the strokes are hinted with correction information at the resolution level where the distortion occurs. Correction information may include moving key points to pixel centers, intersections or edges, depending on the result desired at that resolution level.

When a glyph-based character is requested for display, the next step centers each labeled key point of the strokes of a glyph with hint information in the (dot matrix) grid (pixel) that it is addressed to within display character space. If a key point is not labeled with hint information, the key point location is unchanged in the display character space. Then, the feature points are calculated according to the generated and stored values relative to the location of the key points and width values. Curve segments between the calculated feature points are calculated according to curve ratios stored in the curve level table of each glyph's strokes. The curve ratios are retrieved from the curve level table according to the resolution level of the output device. The curve segments join to form the outline of the strokes. Finally, a filling technique fills the area within the stroke outline. The filling technique activates a pixel according to predefined criteria. In the present invention, a pixel is filled if at least half of the pixel is covered by the area within the calculated stroke outline, or if the center of a pixel is within the calculated stroke outline, or if an extending portion of the calculated stroke outline is predefined as requiring display emphasis. In order to save processing time, a commonly known filing technique uses a predetermined number of cords to represent curve segments of various radii for activating pixels. Other type of filling techniques may be used to accomplish efficient generation of the characters.

The font designer can also designate the level at which hinting information will be used during display processing of the stored basic strokes. For example, if the font designer designates Level 1, of the examples shown in FIGS. 3B–3M as a hint information active level, all levels below and including Level 1 will exhibit active hinting of key points labeled with hint information. Other types of information may be attached to one or more curve levels. The hinting process is described in more detail below with FIGS. 10A and B.

Figure 16:
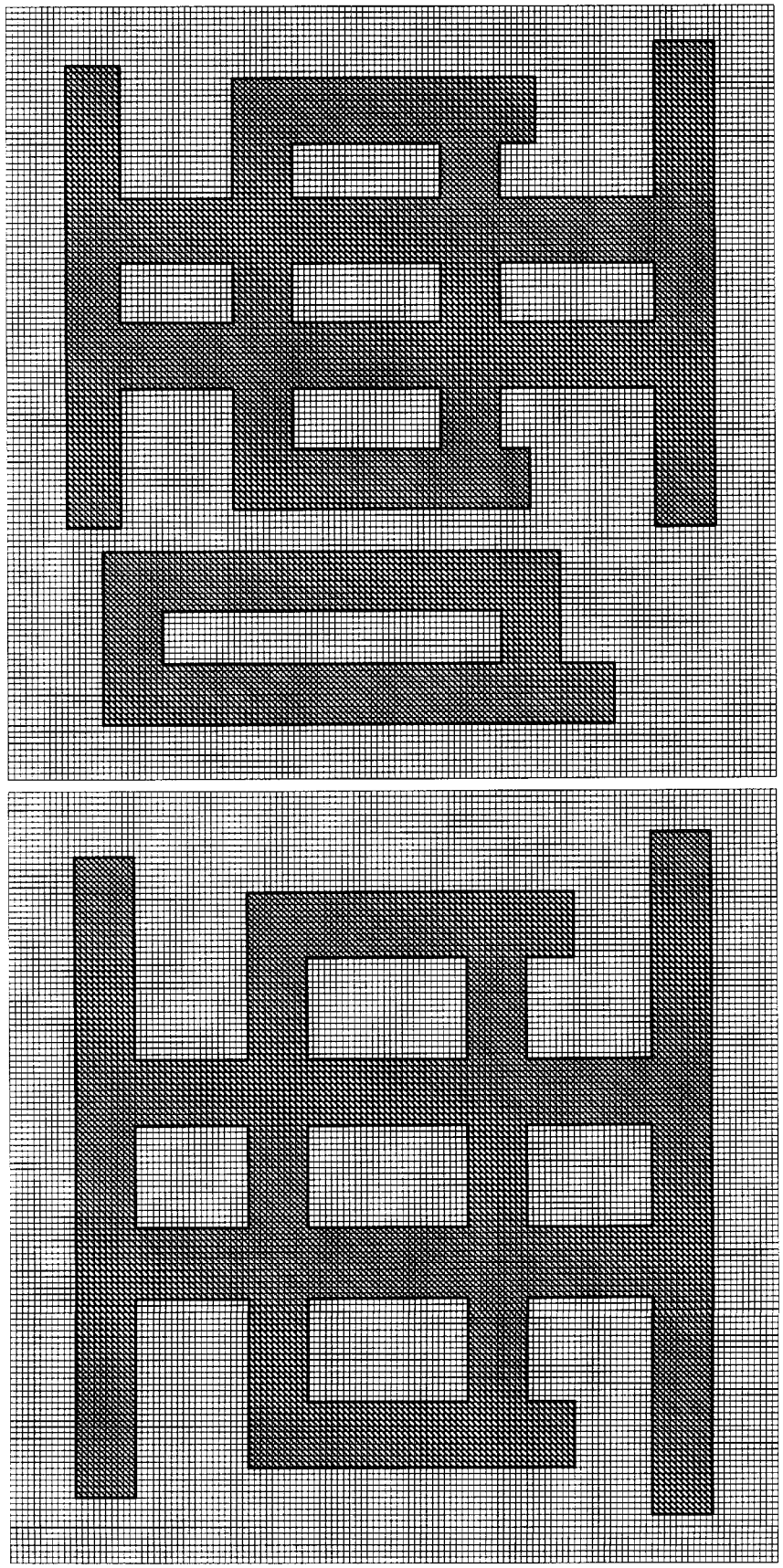
Figure 17:
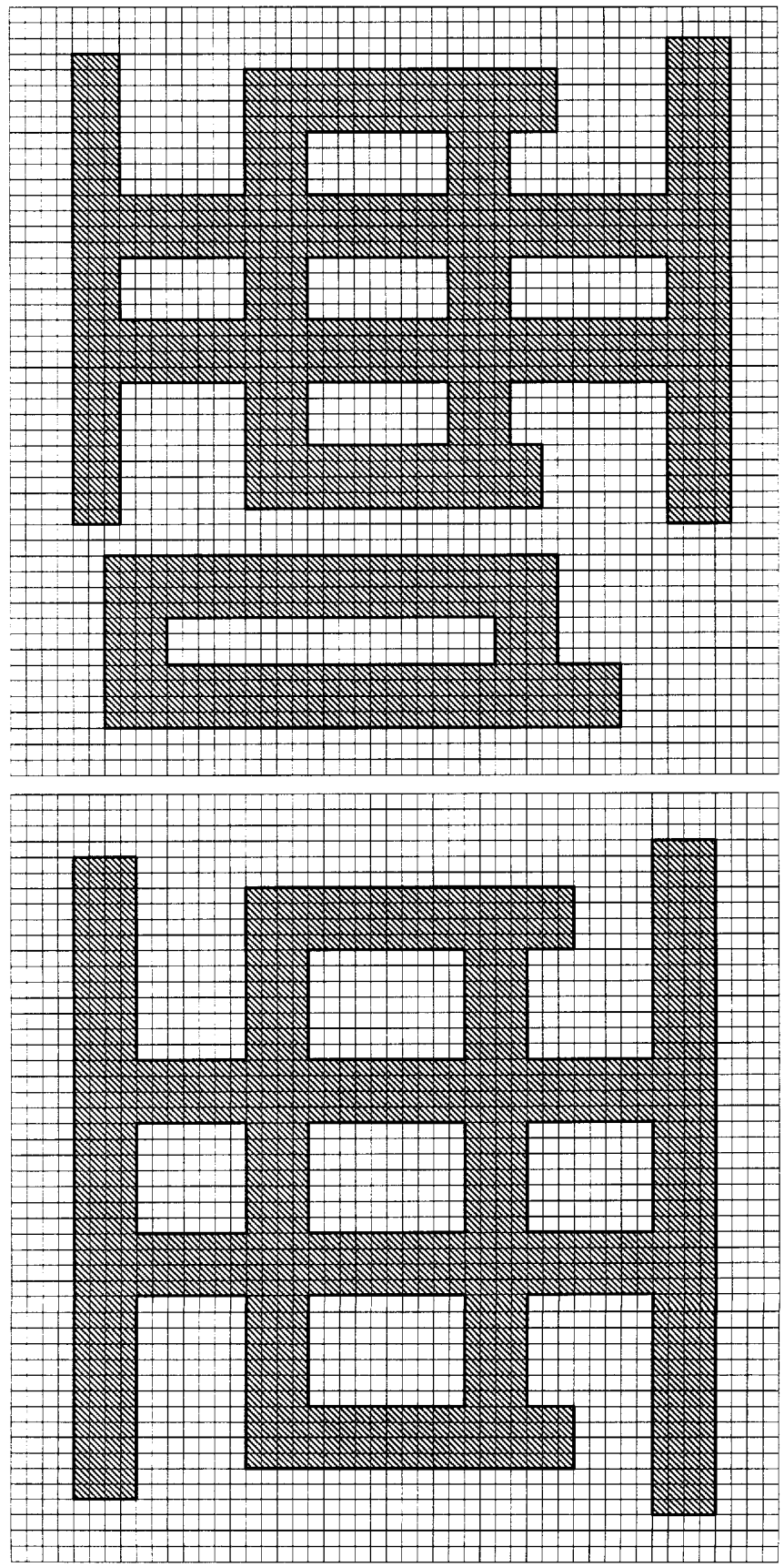

FIGS. 15–18 illustrate assigning predefined curve levels to level of resolution levels. As shown in FIG. 15, the curves preassigned to levels are further assigned to pixel width and height ranges of resolution. FIG. 16 illustrates a set of characters generated for a 128×128 pixel character space according to the assigned curves of FIG. 15. FIG. 17 illustrates the same set of characters generated for a 48×48 pixel character space and FIG. 18 illustrates the character set generated for a 24×24 pixel character space according to the assigned curves of FIG. 15. Thus, it is shown that the present invention is compatible with displays of various levels of detail.

As will be readily appreciated by those skilled in the art and others, the invention has a number of advantages. Outline fonts can be rendered at high speed at any level of resolution from a single set of glyph data that occupies minimal memory space.

While the preferred embodiment of the invention has been illustrated and described, it will be apparent that various changes can be made therein without departing from the spirit and scope of the invention.

The embodiments of the invention in which an exclusive property or privilege is claimed are defined as follows:

1. A resolution-independent character generating method for generating character images for display on an output device having a predefined level of resolution, wherein each generated character is defined by a set of stroke-based glyphs, said method comprising:

selecting a character for display on the output device;

retrieving prestored stroke-based glyphs that are associated with the selected character, wherein the prestored stroke-based glyphs comprise explicit and implicit data, the explicit data including key points and a width value of one or more strokes that define a glyph and the implicit data including feature points and curve values of the one or more strokes of the glyph; and generating the selected character by rendering the retrieved stroke-based glyphs of the selected character according to the predefined explicit and implicit data of the retrieved stroke-based glyphs and the level of resolution of the output device, wherein the feature points curve values, and level of resolution of the output device define curve segment intersection information for each intersecting stroke of a glyph.

2. The method of claim 1, wherein each glyph comprises information of one or more stroke.

3. The method of claim 1, wherein generating the selected character by rendering the retrieved stroke-based glyphs further comprises rendering each glyph by filling the outline of the intersecting strokes of the glyph.

4. The method of claim 3, wherein the feature points, curve values and curve segment intersection information are associated with a range of levels of resolution.

5. The method of claim 1, further comprising rendering a glyph at a display space location different from the glyph's prestored display space location according to the level of resolution of the output device, wherein the glyph's prestored display space location is defined by the key points of the glyph's strokes.

6. A method for defining a set of characters as a set of stroke-based glyphs, wherein each character is defined by at least one stroke identified by one or more key points and one or more width values, and feature points and curve segments associated with a range of levels of resolution, said method comprising:

(a) retrieving characters with a similar glyph from the set of characters, wherein a glyph includes at least one stroke;

(b) if the similar glyphs include intersecting strokes, determining the intersecting curve segments at the locations on the outlines of the intersecting strokes where the intersection between strokes occurs at various levels of resolution;

(c) determining the characters from the retrieved set of characters that include similar glyphs with the same determined intersecting curve segments at the various levels of resolution;

(d) saving the stroke information that identifies the similar glyphs and the intersecting curve segments at various levels of resolution as a basic glyph for the determined characters; and (e) repeating (a)–(d) until all characters in the set of characters are identified by a basic glyph.

7. The method of claim 6, further comprising transmitting basic glyphs when the corresponding characters are requested.

8. A computer-readable medium encoded with a data structure for generating resolution-independent character images for display on an output device having a predefined level of resolution, wherein each generated character is defined by a set of stroke-based glyphs, said computer-readable medium for performing the steps comprising:

selecting a character for display on the output device;

retrieving prestored stroke-based glyphs that are associated with the selected character, wherein the prestored stroke-based glyphs comprise explicit and implicit data, the explicit data including key points and a width value of one or more strokes that define a glyph and the implicit data including feature points and curve values of the one or more strokes of the glyph; and generating the selected character by rendering the retrieved stroke-based glyphs of the selected character according to the predefined explicit and implicit data of the retrieved stroke-based glyphs and the level of resolution of the output device, wherein the feature points, curve values, and level of resolution of the output device define curve segment intersection information for each intersecting stroke of a glyph.

9. The computer-readable medium of claim 8, wherein each glyph comprises information of one or more stroke.

10. The computer-readable medium of claim 8, wherein generating the selected character by rendering the retrieved stroke-based glyphs further comprises rendering each glyph by filling the outline of the intersecting strokes of the glyph.

11. The computer-readable medium of claim 8, wherein the feature points, curve values and curve segment intersection information are associated with a range of levels of resolution.

12. The computer-readable medium of claim 8 further comprising rendering a glyph at a display space location different from the glyph's prestored display space location according to the level of resolution of the output device, wherein the glyph's prestored display space location is defined by the key points of the glyph's strokes.

13. A graphical interface tool for defining a set of characters as a set of stroke-based glyphs, wherein each character is defined by at least one stroke identified by one or more key points and one or more width values, and feature points and curve segments associated with a range of levels of resolution, said graphical interface tool comprising:

means for retrieving characters with a similar glyph from the set of characters, wherein a glyph includes at least one stroke;

if the similar glyphs include intersecting strokes, means for determining the intersecting curve segments at the locations on the outlines of the intersecting strokes where the intersection between strokes occurs at various levels of resolution;

means for determining the characters from the retrieved set of characters that include similar glyphs with the same determined intersecting curve segments at the various levels of resolution;

means for saving the stroke information that identifies the similar glyphs and the intersecting curve segments at various levels of resolution as a basic glyph for the determined characters; and means for repeating the functions performed by the above means until all characters in the set of characters are identified by a basic glyph.

* * * * *